US008649529B2

(12) United States Patent
Klefenz et al.

(10) Patent No.: US 8,649,529 B2
(45) Date of Patent: Feb. 11, 2014

(54) APPARATUS, METHOD AND COMPUTER PROGRAM FOR LOCALIZING A SOUND SOURCE

(75) Inventors: Frank Klefenz, Mannheim (DE); Thomas Sporer, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 240 days.

(21) Appl. No.: 12/970,991

(22) Filed: Dec. 17, 2010

(65) Prior Publication Data

US 2011/0110531 A1 May 12, 2011

Related U.S. Application Data

(63) Continuation of application No. PCT/EP2009/004441, filed on Jun. 19, 2009.

(30) Foreign Application Priority Data

Jun. 20, 2008 (DE) .......................... 10 2008 029 352

(51) Int. Cl.
*H04R 3/00* (2006.01)
(52) U.S. Cl.
USPC ............................................. 381/92; 381/356
(58) Field of Classification Search
USPC ...................... 381/91–92, 122, 356
See application file for complete search history.

(56) References Cited

U.S. PATENT DOCUMENTS

| 3,854,117 | A | | 12/1974 | Fothergill | |
| 4,489,442 | A | * | 12/1984 | Anderson et al. ............... | 381/81 |
| 4,577,299 | A | | 3/1986 | Blaschke et al. | |
| 6,618,485 | B1 | | 9/2003 | Matsuo | |
| 7,587,055 | B2 | * | 9/2009 | Kujirai et al. .................. | 381/92 |
| 2003/0133577 | A1 | * | 7/2003 | Yoshida .......................... | 381/56 |
| 2006/0045289 | A1 | * | 3/2006 | Kujirai et al. ................... | 381/92 |
| 2007/0104026 | A1 | * | 5/2007 | Rubin ............................. | 367/13 |
| 2007/0291968 | A1 | * | 12/2007 | Joublin et al. ................. | 381/309 |
| 2008/0144840 | A1 | * | 6/2008 | Goldstein et al. ............... | 381/56 |
| 2008/0279391 | A1 | * | 11/2008 | Yoshida .......................... | 381/92 |

FOREIGN PATENT DOCUMENTS

| DE | 3220175 C2 | 5/1985 |
| WO | 2009/048291 A1 | 4/2009 |

OTHER PUBLICATIONS

Official Communication issued in International Patent Application No. PCT/EP2009/004441, mailed on Sep. 14, 2009.
Goulet et al., "Object Localization Through the Lateral Line System of Fish: Theory and Experiment," J Comp Physiol A, vol. 194, 2008, pp. 1-17.
Van Hemmen, "The Map in Your Head: How Does the Brain Represent the Outside World," Chemphyschem, vol. 3, 2002, pp. 291-298.
Lee et al., "Acoustic Beamforming Using a Novel Correlation Technique," Meas. Sci. Technol. vol. 2, 1991, pp. 229-237.

* cited by examiner

*Primary Examiner* — Disler Paul
(74) *Attorney, Agent, or Firm* — Keating & Bennett, LLP

(57) ABSTRACT

An apparatus for localizing a sound source includes at least two rotatably arranged microphones, a drive formed to set the microphones into rotation, and an evaluator. The evaluator is formed to receive microphone signals of the at least two microphones, while the at least two microphones are moving, and to obtain information on a direction from which sound arrives from the sound source or information on a position of the sound source, using the microphone signals obtained during the movement of the microphones.

38 Claims, 17 Drawing Sheets

APPARATUS, METHOD AND COMPUTER PROGRAM FOR LOCALIZING A SOUND SOURCE

CROSS-REFERENCE TO RELATED APPLICATIONS

This application is a continuation of copending International Application No. PCT/EP2009/004441, which was filed on Jun. 19, 2009, which is incorporated herein by reference in its entirety, and additionally claims priority from German Application No. 102008029352.0, which was filed on Jun. 20, 2008, which is also incorporated herein by reference in its entirety.

BACKGROUND OF THE INVENTION

Embodiments of the invention relate to an apparatus, a method and a computer program for localizing a sound source. Some embodiments according to the invention relate to a rotating microphone field (also referred to as a microphone array) or rotating microphone fields. Some embodiments according to the invention relate to the construction of a rotating microphone field.

Some embodiments according to the invention relate to a Doppler microphone field or Doppler microphone fields.

In many cases, it is desirable to determine a position of a sound source or a direction from which sound comes or arrives. For example, there are systems in which it is desired to localize an object marked by a sound transmitter. Depending on the case of application, it may be desirable to detect only the direction in which the object is located, or even the exact position of the object. In the following, in general, the determination of complete or partial positional information (e.g. directional information) with regard to a sound source is understood by localization.

For localizing a sound source, there is a multiplicity of conventional concepts. For example, one or more linear microphone fields can be employed. When using one or more linear microphone fields, however, directional accuracy is limited by the length of the field. Hence, very long fields are necessary for exact location, for example. Moreover, accuracy of an individual measurement is limited, because the signal-to-noise ratio (SNR) is limited, for example. Furthermore, sometimes there is a problem regarding accuracy of the position or positions of the individual microphones in linear microphone fields. For a complete 3-dimensional measurement (3-D measurement), conventionally several fields are required in many cases. In some other conventional arrangements, rotation of a field or microphone field is necessary between the measurements, which may entail problems regarding accuracy and regarding the time needed.

In some further conventional concepts, a single microphone or a few microphones are moved between measurements by way of stepper motors. Positional accuracy is limited here in many cases by the length of a sampled or "scanned" area. For exact localization, very long fields are thus needed in some conventional arrangements. Furthermore, accuracy of an individual measurement is limited in some conventional arrangements, for example due to the limited signal-to-noise ratio.

When moving a single or a few microphones with stepper motors, the problem of the accuracy of the position of the microphone positions does not seldom arise. For example, problems may result due to tolerances of the stepper motor or due to vibrations of the construction. Furthermore, the construction of the arrangement for moving a single or a few microphones with stepper motors without reflections at fixtures is difficult.

Some further conventional arrangements include so-called circular fields (also referred to as "circular arrays").

In some arrangements, using circular fields, directional accuracy is limited by the diameter of the field. In some conventional arrangements, very large fields are necessary for exact localization. Furthermore, the accuracy of the individual measurements is limited by the achievable signal-to-noise ratio, for example.

In some conventional arrangements, using circular fields, the problem of the accuracy of the position of the individual microphones arises. Furthermore, construction without reflections at fixtures is difficult in some cases.

In some further conventional arrangements, rotation of a single or a few microphones takes place in a circle with a stepper motor between measurements. Directional accuracy here is limited by a length of an area circumscribed in some cases. In some arrangements of such kind, a very large diameter is necessary for exact localization. Furthermore, accuracy of the individual measurements is also limited by an achievable signal-to-noise ratio (SNR), for example. In some arrangements there is also a problem with the accuracy of the position of the microphone positions. Problems regarding the accuracy of the position may, for example, result from tolerances of the stepper motor or from vibrations of the construction, particularly when using a long microphone arm.

In view of the above explanations, it can be seen that directional accuracy is limited by the size of the arrangements, in many conventional arrangements.

Hence, there is a need for a concept which enables, at given dimensions of an arrangement, obtaining particularly expressive information regarding the position of a sound source or regarding the direction from which sound arrives.

SUMMARY

According to an embodiment, an apparatus for localizing a sound source may have: at least two rotatably arranged microphones; a drive formed to set the microphones into rotation; and an evaluator formed to receive microphone signals of at least two microphones, while the at least two microphones are moving, and to obtain information on a direction from which sound from the sound source arrives or information on a position of the sound source, using the microphone signals obtained during the movement of the microphones, wherein the evaluator is formed to evaluate a Doppler frequency shift between a first microphone signal from a first one of the microphones and a second microphone signal from a second one of the microphones.

According to another embodiment, a method of localizing a sound source may have the steps of: obtaining microphone signals from at least two microphones, while the at least two microphones perform rotation; and determining information on a direction from which sound arrives from the sound source or information on a position of the sound source, using the microphone signals obtained during the movement of the microphones, wherein a Doppler frequency shift between a first microphone signal from a first one of the microphones and a second microphone signal from a second one of the microphones is evaluated.

Another embodiment may have a computer program for performing the above method of localizing a sound source, when the computer program is executed on a computer.

According to another embodiment, an apparatus for localizing a sound source may have: at least two rotatably arranged microphones; a drive formed to set the microphones into rotation; and an evaluator formed to receive microphone signals of at least two microphones, while the at least two microphones are moving, and to obtain information on a direction from which sound from the sound source arrives or information on a position of the sound source, using the microphone signals obtained during the movement of the microphones; wherein the evaluator is formed to provide the information on the direction or the information on the position depending on at which orientation of the microphones a difference between the microphone signals of the microphones is within a given range with respect to an amplitude and with respect to a phase.

According to another embodiment, an apparatus for localizing a sound source may have: at least two rotatably arranged microphones; a drive formed to set the microphones into rotation; and an evaluator formed to receive microphone signals of at least two microphones, while the at least two microphones are moving, and to obtain information on a direction from which sound from the sound source arrives or information on a position of the sound source, using the microphone signals obtained during the movement of the microphones; wherein the evaluator is formed to sample microphone signals from the microphones at a sampling rate, and wherein the evaluator is formed to obtain information on the sampling rate on the basis of knowledge of a frequency of a sound signal originating from the sound source and using a plurality of samples.

According to still another embodiment, an apparatus for localizing a sound source may have: at least two rotatably arranged microphones; a drive formed to set the microphones into rotation; and an evaluator formed to receive microphone signals of at least two microphones, while the at least two microphones are moving, and to obtain information on a direction from which sound from the sound source arrives or information on a position of the sound source, using the microphone signals obtained during the movement of the microphones; wherein the evaluator is formed to determine an autocorrelation function of at least one of the microphone signals, in order to obtain the rotational speed at which the microphones move using the autocorrelation function.

According to another embodiment, an apparatus for localizing a sound source may have: at least two rotatably arranged microphones; a drive formed to set the microphones into rotation; and an evaluator formed to receive microphone signals of at least two microphones, while the at least two microphones are moving, and to obtain information on a direction from which sound from the sound source arrives or information on a position of the sound source, using the microphone signals obtained during the movement of the microphones; wherein the evaluator is formed to determine the information on the direction or the information on the position, using information on a characteristic point of an envelope of a difference signal, wherein the difference signal describes a difference between microphone signals of at least two of the movable microphones.

According to another embodiment, an apparatus for localizing a sound source may have: at least two rotatably arranged microphones, wherein an acoustically hard separating body is arranged between the microphones; a drive formed to set the microphones into rotation; and an evaluator formed to receive microphone signals of at least two microphones, while the at least two microphones are moving, and to obtain information on a direction from which sound from the sound source arrives or information on a position of the sound source, using the microphone signals obtained during the movement of the microphones.

Embodiments according to the invention are based on the finding that a microphone signal from a rotatably arranged microphone has particularly much information content if the microphone signal is obtained while the microphone is moving. While a microphone signal, which is recorded by a stationary microphone, only comprises information on a phase of a sound wave present at the location of the microphone, a microphone signal recorded during the movement of the microphone additionally carries information on a relation between a direction of movement of the microphone and a direction of propagation of the sound waves. This additional information substantially arises due to a Doppler frequency shift, with an amount of the Doppler frequency shift being dependent both on a magnitude and on a direction of the velocity at which the microphone is moving. In particular in the course of a rotation of the microphone, especially expressive information can be obtained, since a relation between the direction of movement of the microphone and the direction of propagation of the sound waves typically changes in the course of the rotation.

In summary, it can thus be stated that a microphone signal recorded during rotation of a microphone carries especially expressive information for the determination of information on a direction from which sound from a sound source arrives or especially expressive information on a position of the sound source, or that the information on the direction from which the sound arrives or the information on the position of the sound source can be acquired in an especially expressive way from the microphone signal received during the rotation.

Further details regarding the inventive concept as well as further advantages of the concept will still be explained in the following.

BRIEF DESCRIPTION OF THE DRAWINGS

Embodiments of the present invention will be explained in greater detail in the following with reference to the accompanying figures, in which.

DETAILED DESCRIPTION OF THE INVENTION

Figure 1:
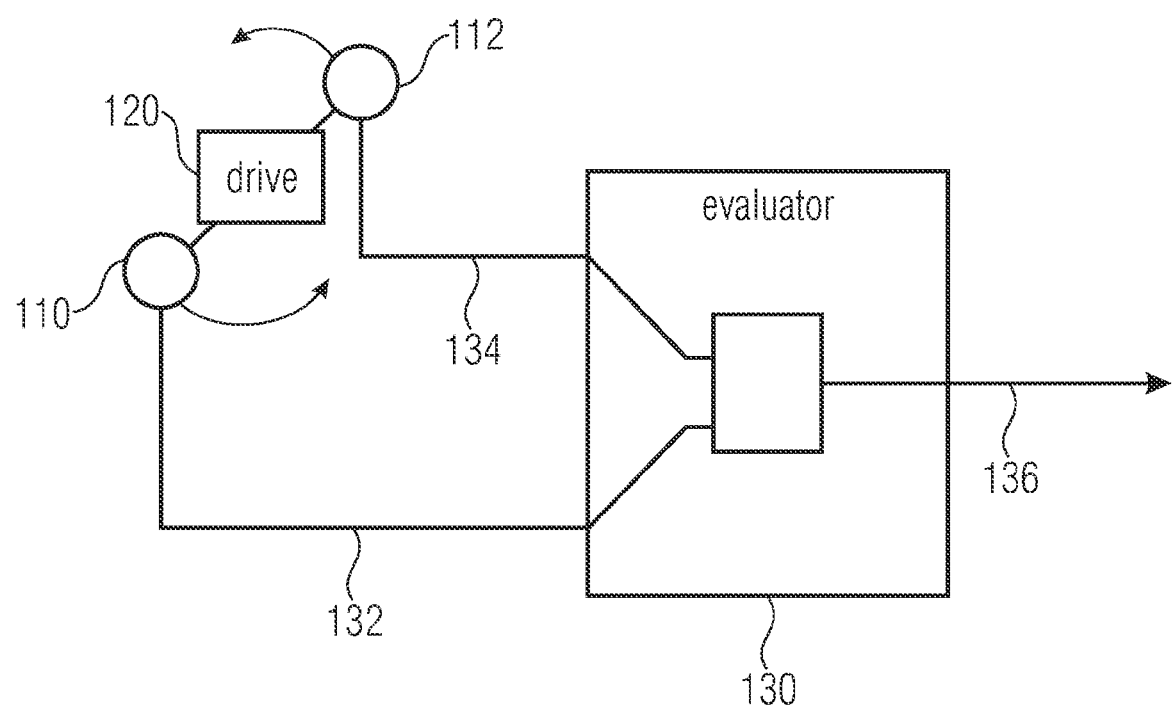
FIG. 1 is a block circuit diagram of an apparatus for localizing a sound source, according to an embodiment of the invention.

FIG. 1 shows a block circuit diagram of an apparatus for localizing a sound source, according to an embodiment of the invention. The apparatus according to FIG. 1 is designated with 100 in its entirety. The apparatus 100 includes at least two rotatably arranged microphones 110, 112. The apparatus 100 further includes a drive 120, which is formed to set the microphones 110, 112 into rotation. The apparatus 100 further includes an evaluator 130, which is formed to receive microphone signals 132, 134 of the at least two microphones 110, 112, while the at least two microphones are moving. The evaluating unit 130 is further formed to obtain information 136 on a direction from which the sound arrives from the sound source or information on a position of the sound source, using the microphone signals 132, 134 obtained during the movement of the microphones. The sound source is not shown in FIG. 1, since the sound source is not a mandatory component of the means 100, of course.

In the following, the functioning of the apparatus 100 will be explained briefly. The evaluating unit 130 of the apparatus 100 is capable of evaluating microphone signals having been received or recorded or sampled during the movement of the microphones. Hence, the microphone signals 132, 134 include the effects of a Doppler shift. It has turned out that position determination on the basis of two or more microphone signals, which comprise a Doppler frequency shift due to rotation, leads to particularly good results. A Doppler shift can be evaluated in very different ways, for example by evaluation of a phase relation between two or more microphone signals 132, 134, by evaluation of an amount of the Doppler frequency shift, or by evaluation of a temporal course of the Doppler frequency shift. Generally speaking, it thus may be stated that particularly high accuracy in the position determination results from the fact that not only microphone signals of static microphones are recorded, but that rather microphone signals from moving microphones are used. Due to the rotation of the microphones, the microphone signals are particularly expressive and are especially good for the position determination, since the characteristics of the microphones can be evaluated particularly well, for example regarding the Doppler shift occurring therein.

In some embodiments, taking the Doppler frequency shift, which develops due to the rotation and periodically changes due to the rotation, into account allows for particularly precise position determination on the basis of only two microphone signals. In some embodiments, it is possible even to completely determine, on the basis of only two microphone signals, the position at which a sound source is located or at least a direction from which sound arrives, which is not or hardly possible at all with conventional arrangements, using only two stationary microphones. In summary, it thus can be stated that the apparatus 100 allows for more precise localization than conventional apparatuses, since the two microphone signals 132, 134 comprise a Doppler shift, which carries further information on the position of the sound source in addition to the mere phase information of the microphone signals 132, 134, due to the rotation of the microphones 110, 112.

Further details will be described in the following with reference to FIGS. 2, 3a and 3b.

Figure 2:
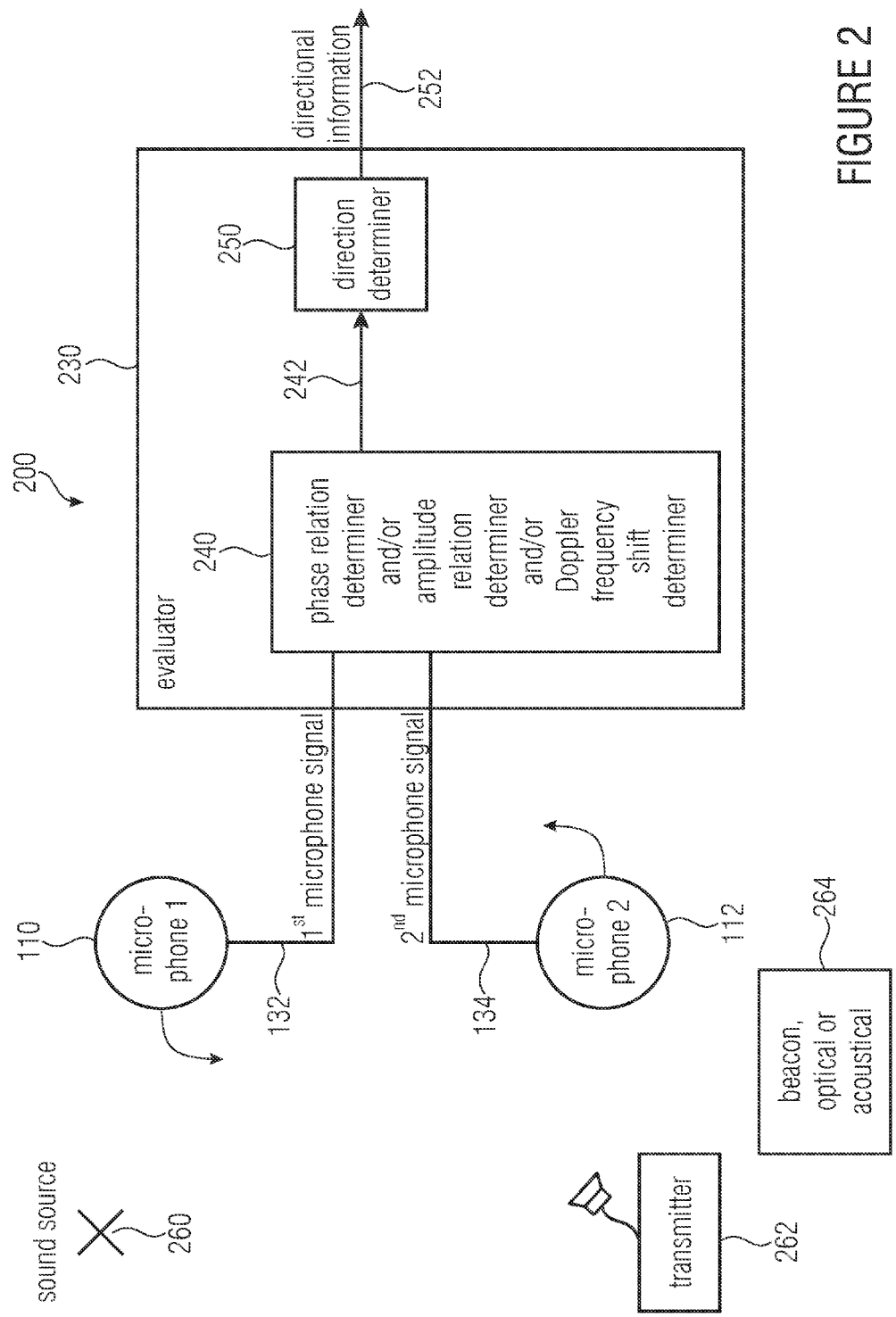
FIG. 2 is a block circuit diagram of an apparatus for localizing a sound source, according to a further embodiment of the invention.

FIG. 2 shows a block circuit diagram of an apparatus for localizing a sound source, according to an embodiment of the invention. The apparatus according to FIG. 2 is designated with 200 in its entirety.

It is to be pointed out here that, within the framework of the present description, like reference numerals designate like or similarly acting means and/or signals corresponding to each other.

The apparatus 200 includes a first microphone 110 as well as a second microphone 112. The microphones 110, 112 are movably arranged and may, for example, be set into rotation by a drive not shown in FIG. 2. The apparatus 200 includes an evaluator 230, which substantially corresponds to the evaluator 130 of the apparatus 100. The evaluator 230 is formed to receive a first microphone signal 132 from the first microphone 110 as well as a second microphone signal 134 from the second microphone 112. The microphone signals 132, 134 may, for example, describe an air pressure at the location of the microphones 110, 112, while the microphones are in rotation.

The evaluator 230 includes an information extractor 240 formed to extract information from the microphone signals 132, 134, for example.

For example, the information extractor 240 may be formed to determine information on a phase relation between the first microphone signal 132 and the second microphone signal 134. In other words, the information extractor 240 may comprise a phase relation determiner formed to determine how strongly a phase location of the first microphone signal 132 is shifted with respect to a phase location of the second microphone signal 134. The phase relation determiner may, for example, be formed to determine how strongly maxima, minima or zero crossings of the microphone signals 132, 134 are shifted with respect to each other in time.

Alternatively or additionally, the information extractor 240 may further comprise an amplitude determiner formed to evaluate an amplitude relation between the first microphone signal 132 and the second microphone signal 134. The amplitude relation determiner may, for example, determine whether an amplitude of the first microphone signal 132 is smaller than the amplitude of the second microphone signal 134, equal to the amplitude of the second microphone signal 134, or greater than the amplitude of the second microphone signal 134.

Alternatively or additionally, the information extractor 240 may further comprise a Doppler frequency shift determiner formed to recognize a frequency shift of one of the microphone signals and provide information describing the frequency shift of at least one of the microphone signals 132, 134.

In summary, it thus can be stated that different information can be extracted from the microphone signals 132, 134 (and maybe from additional microphone signals, which are not shown). For example, using the phase relation determiner or the Doppler frequency shift determiner, an influence of the Doppler effect on the microphone signals 132, 134 can be evaluated. An amplitude relation between the microphone signals 132, 134 may also be employed for improving the precision of the direction determination or position determination, in some embodiments. Hence, the information extractor 240 altogether provides information 242 based on a phase relation between the microphone signals 132, 134 (or describing this phase relation), or describing an amplitude relation between the microphone signals 132, 134 (or based thereon), or describing a Doppler frequency shift of at least one of the microphone signals 132, 134. However, the information 242 may also include a combination of two or more pieces of the above-mentioned information.

The evaluator 230 further includes a direction determiner 250. The direction determiner 250 may be formed to provide directional information or positional information 252 on the basis of information 242 provided by the information extractor 240. The directional information or positional information 252 may, for example, carry information regarding the direction from which a sound signal arrives at the apparatus from a sound source. As an alternative thereto, the positional information 252 may also carry information on a position of the sound source. In some embodiments, the positional information may, for example, carry an estimate regarding the distance between the sound source and the apparatus 200.

As can be seen from FIG. 2, signals from various sound sources can be processed here, or localization of sound sources of various types can be performed. For example, the apparatus 200 can be used in connection with a sound source emitting a wide-band frequency spectrum. Such a sound source is designated with 260 in FIG. 2, for example. The sound source 260 may, for example, be a human who is talking, singing or making sounds in another way, or a loudspeaker reproducing a wide-band audio signal.

Alternatively (or additionally), the sound source may be a transmitter employed for position determination in a targeted manner, for example generating a narrow-band, for example approximately sinusoidal, signal. Such a transmitter is designated with 262 in FIG. 2. Furthermore, for example for calibration of the apparatus 200, a sound source of known position or at least known direction can be employed. Such a sound source may, for example, be referred to as a beacon. One example of a beacon is designated with 264 in FIG. 2.

Details regarding evaluation of the microphone signals 132, 134 will be explained in greater detail in the following with respect to FIGS. 3a and 3b.

Figure 3A:
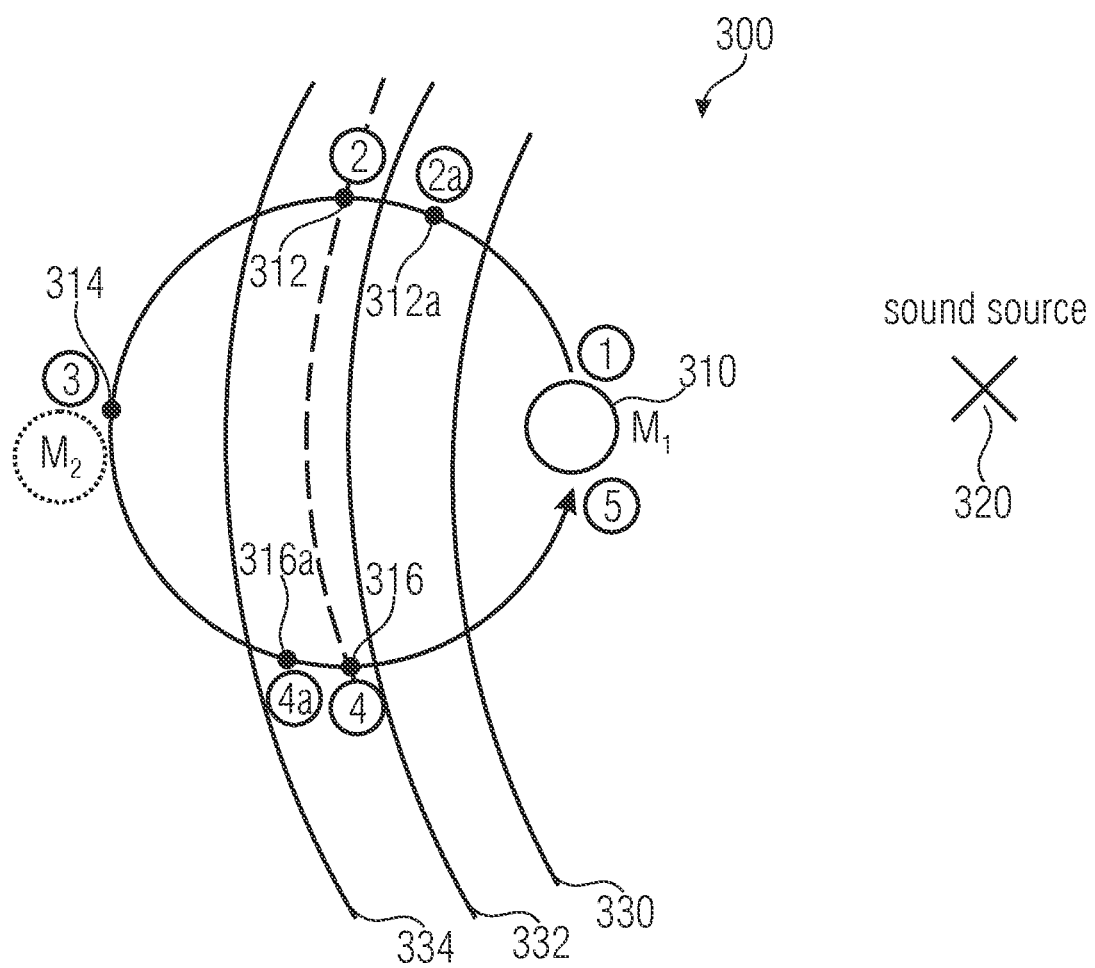
FIG. 3a is a schematic illustration of various positions at which a rotatable microphone may be located, as well as of a propagation of sound sources.

FIG. 3a shows a schematic illustration of propagation of a sound wave, as well as also a schematic illustration of a movement of two microphones M1, M2. The schematic illustration of FIG. 3a is designated with 300 in its entirety. The schematic illustration 300 shows the first microphone M1 at a first position 310. Furthermore, the schematic illustration 300 shows a second position 312 of the first microphone, a third position 314 of the first microphone, a fourth position 316 of the first microphone and a fifth position of the first microphone, which coincides with the first position 310. Besides, it is to be stated that, in some embodiments, the second microphone M2 lies opposite the first microphone M1 in each case.

The schematic illustration 300 further shows another position 312a of the first microphone M1, which lies between the first position 310 and the second position 312 in the sequence of motion. Furthermore, the schematic illustration 300 shows another position 316a of the first microphone M1, which lies between the third position 314 and the fourth position 316 in a sequence of motion.

A sound source 320 lies, for example, outside an area enclosed by a possibly circular revolution of the first microphone 312. The sound source 320 generates a plurality of sound wave fronts 330, 332, 334, as shown in the schematic illustration 300.

In the following, it will be assumed that the first microphone M1 cycles through a circular motion (for example with at least approximately constant angular speed) starting from the first position 310, and hence reaches the second position 312, the third position 314, the fourth position 316 and finally again the first position 310 successively. Hence, a distance of the first microphone M1 from the sound source 320 increases more and more during the movement of the first microphone from the first position 310 to the third position 314. Thus, the first microphone M1 moves away from the sound source in the movement from the first position 310 to the third position 314. When moving from the third position 314 back to the first position 310 (also referred to as fifth position) the first microphone M1 moves toward the sound source 320, however.

Besides, it is assumed that the second microphone also moves along the same circular path as the first microphone M1, but temporally offset and/or shifted at a certain angle, e.g. 180 degrees. In the following, various aspects of the microphone signals of the microphones M1, M2 will be described on the basis of FIG. 3b. FIG. 3b shows, at reference numeral 350, a graphical illustration of a temporal course of a Doppler frequency shift of the first microphone signal provided by the first microphone M1. An abscissa 352 describes a path covered by the first microphone, e.g. starting from the first position 310. An ordinate 354, on the other hand, describes a frequency and/or a frequency shift. Here, it is assumed that the sound source 320 sends out an audio signal and/or an acoustic signal of a fundamental frequency f0. At the first position 310, an effect of a Doppler shift is minimum and/or even negligible. When moving from the first position 310 to the second position 312, the first microphone moves away from the sound source 320. Hence, a Doppler shift of the microphone signal takes place such that a frequency of the microphone signal is lowered with respect to the fundamental frequency. At the second position 312, the Doppler shift reaches, for example, a maximum value in terms of magnitude, so that the microphone signal of the first microphone M1 has a minimum frequency. When the first microphone M1 moves from the second position 312 to the third position 314, however, the magnitude of the Doppler shift decreases again, so that a frequency shift of the microphone signal, with respect to the fundamental frequency f0, goes back to zero. When the first microphone moves from the third position to the fourth position, the first microphone M1 moves toward the sound source 320, so that a frequency of the microphone signal is increased with respect to the fundamental frequency f0. At the fourth position 316, a magnitude of the Doppler shift again reaches a local maximum. Then, the Doppler shift again decreases when moving from the fourth position 316 to the first position 310, as can be seen from the graphical illustration 350.

In this respect, for example, by evaluating the amount of the Doppler shift, it can be determined at which orientation of the microphones (or at which time of a movement sequence of the microphones) the Doppler shift reaches a maximum, or absolute maximum or minimum value in terms of magnitude. Assuming uniform or constant movement and also symmetry of the arrangement, for example the direction in which the sound source is located can be inferred on the basis of a finding of the second position 312 and the fourth position 316. Thus, it can, for example, be seen that the sound source 320 is in a plane perpendicular to a connecting line between the second position 312 and the fourth position 316, for example. The plane in which the sound source 320 is, for example, lies such that the second position 312 and the fourth position 316 are mirror points with respect to each other regarding the plane as a plane of symmetry. Hence, based on the finding, at which positions 312, 316 the Doppler frequency shift has a local minimum or a local maximum, a direction of the sound source can be determined.

Alternatively or additionally, evaluation of the positions 310, 314 at which the Doppler frequency shift has a zero crossing allows for deriving information on a direction of the sound source 320. For example, if it is known by way of an evaluation of the Doppler frequency shift that the Doppler frequency shift has a zero crossing at the position 310, it can be inferred therefrom that a wave front originating from the sound source 320 at the first position 310 is tangential to a direction of movement of the first microphone M1 at the first location 310. Hence, the position of the sound source 320 can be inferred therefrom.

In some embodiments, both a position 310, 314, at which the Doppler frequency shift has a zero crossing, and also a position 312, 316, at which the Doppler frequency shift has a (local or global) extreme value, can be evaluated so as to be able to infer the position or direction of the sound source 320.

Apart from direct evaluation of the Doppler frequency shift, it is also possible to evaluate other properties of the microphone signals.

For example, at reference numeral 360, a graphical illustration of a phase difference between microphone signals of the first microphone M1 and of the second microphone M2 is illustrated. An abscissa 362 again describes a position of the first microphone. An ordinate 364 describes a phase difference between the microphone signals of the microphones M1 and M2. If the two microphones M1 and M2 are at opposite positions, for example symmetrical to a line connecting a center of the circular motion to the sound source, the first microphone M1 and the second microphone M2 provide signals of equal phase. For example, if the first microphone M1 is at the second position 312 and the second microphone M2 at the same time is at the fourth position 316, the signals arriving at the first microphone M1 and the second microphone M2 are equal in phase. A phase difference thus is zero. Yet, there may still be further rotational positions of the two microphones at which the microphone signal from the first microphone M1 is in phase with the microphone signal of the second microphone M2. For example, if the first microphone M1 is at the position 312a and the second microphone is at the position 316a at the same time, the microphone signal of the first microphone M1 and the microphone signal of the second microphone M2 may be of equal phase. Correspondingly, a phase difference may be zero. This can also be seen from the graphical illustration at reference numeral 360. Yet, there are also embodiments in which only a single rotational position of the microphones M1, M2 at which the microphone signals are of equal phase occurs. The fact of whether ambiguities in this respect occur substantially depends on a relation between a wavelength of the sound source, i.e. a distance between two of the wave fronts 330, 332, 334, and a diameter of the rotation of the microphones M1, M2.

If there are ambiguities, there are various approaches to eliminate the same, or clearly infer at which rotational position of the microphones M1, M2 the orientation is such that the sound source has the same distance from both microphones M1, M2.

A graphical illustration at reference numeral 370 describes a dependence of the amplitudes of the microphone signals provided from the microphones M1, M2 on a rotational position of the microphones M1, M2. An abscissa 372 describes a position of the first microphone M1 and/or a rotational position of the microphones M1, M2. An ordinate 374 describes an amplitude of the microphone signals of the first microphone M1 and of the second microphone M2. Regarding the fact that an intensity of a sound signal decreases quadratically with a distance from the sound source, the amplitude of a microphone signal is usually the stronger, the closer the microphone from which the microphone signal originates is located to the sound source. The corresponding connection can be seen from the graphical illustration at reference numeral 370. It is to be pointed out, however, that the amplitude, of course, only varies relatively slightly if the distance of the sound source to the microphones M1, M2 is substantially greater than a diameter of a rotation of the microphones M1, M2.

Thus, equality of the amplitudes due to the usual tolerances, at least taken by itself, is not a particularly good measure as to when two microphones have equal distances from a sound source.

Yet, in some embodiments, it is advantageous to combine several criteria in order to decide when a distance of two microphones from a sound source is equal or approximately equal.

For example, a position determiner may be formed to recognize a corresponding orientation of two microphones M1, M2 when the phase difference between the microphone signals of the two microphones M1, M2 is smaller than a given threshold value (or lies in a given range), on the one hand, and when additionally an amplitude difference between the two microphone signals is smaller than a given threshold value (or lies within a given range), on the other hand. On the basis of recognition of such an orientation of the microphones M1, M2, for example a direction in which the sound source 320 is located can be determined. For example, a position determiner may recognize that, in a state in which the first microphone is at the second position 312 and in which at the same time the second microphone is at the fourth position 316, the phase difference is sufficiently small, and that also the difference between the amplitude of the microphone signals provided from the microphones M1, M2 is sufficiently small at the same time. However, the position determiner may recognize that, in a case in which the first microphone is at the position 312a and in which the second microphone M2 is at the position 316a, a difference between the amplitudes of the microphone signals is greater than the given threshold value. Correspondingly, for example using information on a phase relation (e.g. on a phase difference between the microphone signals) and information on an amplitude relation (information on a difference of the amplitudes, for example), it can be determined when two microphones M1, M2 are oriented so that they have approximately the same distance from the sound source 320, for example. In other words, the location of the sound source relative to the microphones can be determined from so-called "zero crossings" in the amplitude/phase plane.

Yet, apart from the evaluation of the amplitudes of the microphone signals, which may be comparably unreliable in some cases, there also exist further ways of identifying the right zero crossing of the phase difference. For example, the information on the phase difference as well as the information on the Doppler shift can be evaluated. Thus, for example, it can be determined at which orientation of the microphones the Doppler shift reaches a local extreme. Correspondingly, for example, it can be determined which of the several zero crossings of the phase difference lies closest at that orientation of the microphones leading to an extreme of the Doppler frequency shift.

With reference to the schematic illustration, at reference numerals 350 and 360, for example, it can be seen that the local (or even global) minimum of the Doppler frequency shift lies at about (at least approximately) the second position 312 of the first microphone M1. Correspondingly, it can be inferred that the zero position of the phase difference at the position 312 of the first microphone, and not the zero position at the position 312a of the first microphone is the relevant zero position of the phase difference.

In summary, it can thus be stated that the evaluation of the information regarding the Doppler frequency shift of the microphone signals may advantageously be employed to increase precision and/or reliability of position determination in some embodiments. For example, in the evaluation of the Doppler frequency shift, one or more microphone signals can be used to allow conclusions to be drawn as to the orientation at which two microphones are at an approximately equal distance from a sound source. The corresponding information on the orientation mentioned may then be used for determining positional information regarding the sound source.

In summary, it can be stated that there are totally different possibilities as to which of the information extracted or extractable from the microphone signals is used for position determination. In some embodiments, it may be sufficient to evaluate only the information on the Doppler frequency shift. In other embodiments, it may be sufficient to evaluate only the information on the phase difference. In yet other embodiments, it may be sufficient to evaluate only information on the amplitude of the microphone signals. Yet, in many cases it is advantageous to utilize a combination of the information stated for the position determination, as described above. In some embodiments, it may even be desirable to utilize the information on the Doppler shift as well as the information on the phase difference and the information on the amplitude of the microphone signals for position determination.

Figure 3B:
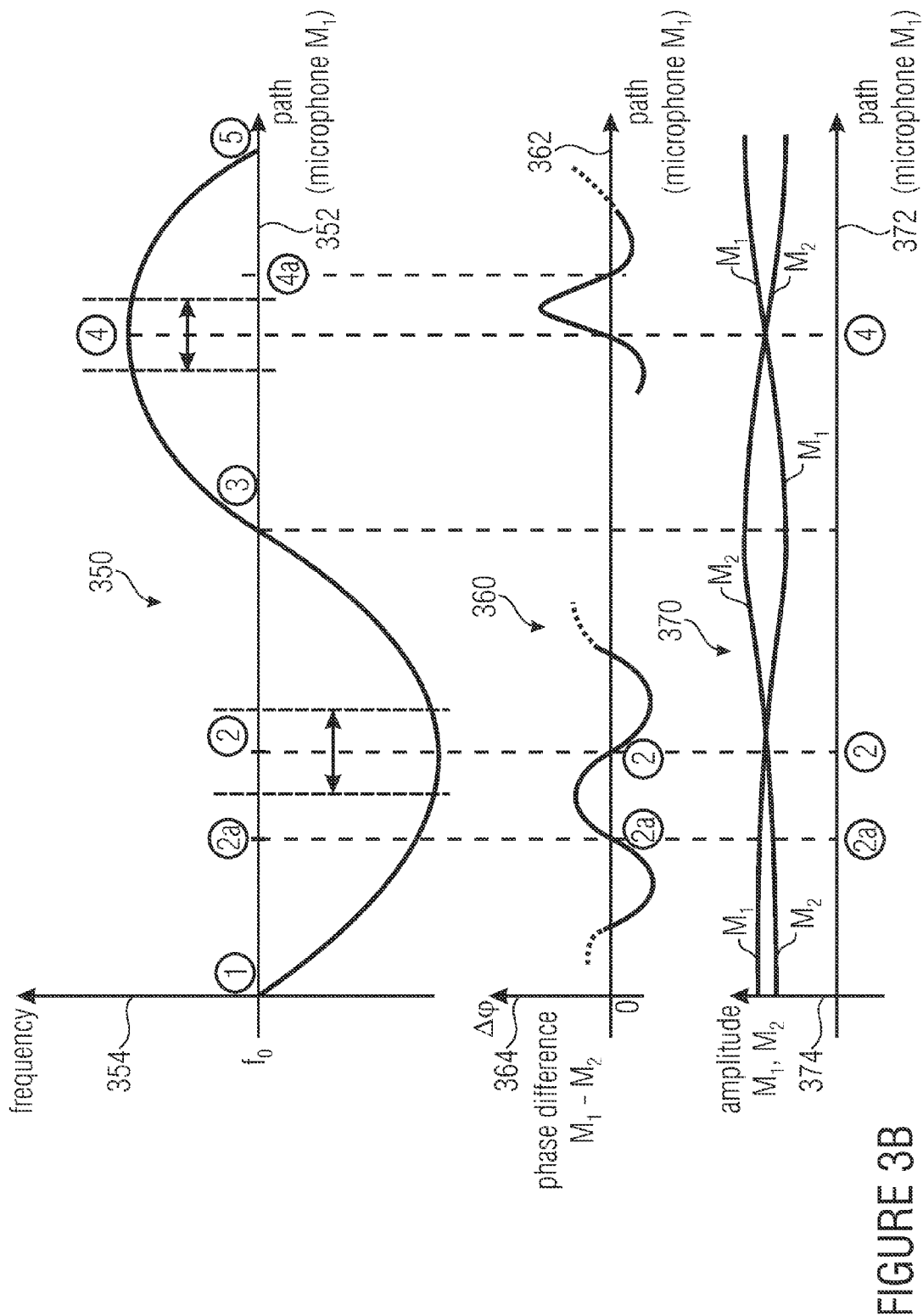
FIG. 3b is a graphical illustration of a Doppler frequency shift, a phase difference between two microphone signals and an amplitude of two microphone signals, depending on a position along a path.

With reference to FIGS. 2, 3a and 3b, while substantially a case in which a sound source is outside an area enclosed by the rotation of the microphones (or a perpendicular projection of the area mentioned) was described, it will be described in the following, with reference to FIGS. 4a, 4b, 5 and 6, how evaluation may take place in the case in which the sound source is in the area enclosed by the rotation of the microphones or in a perpendicular projection of the area enclosed by the rotation.

Figure 4A:
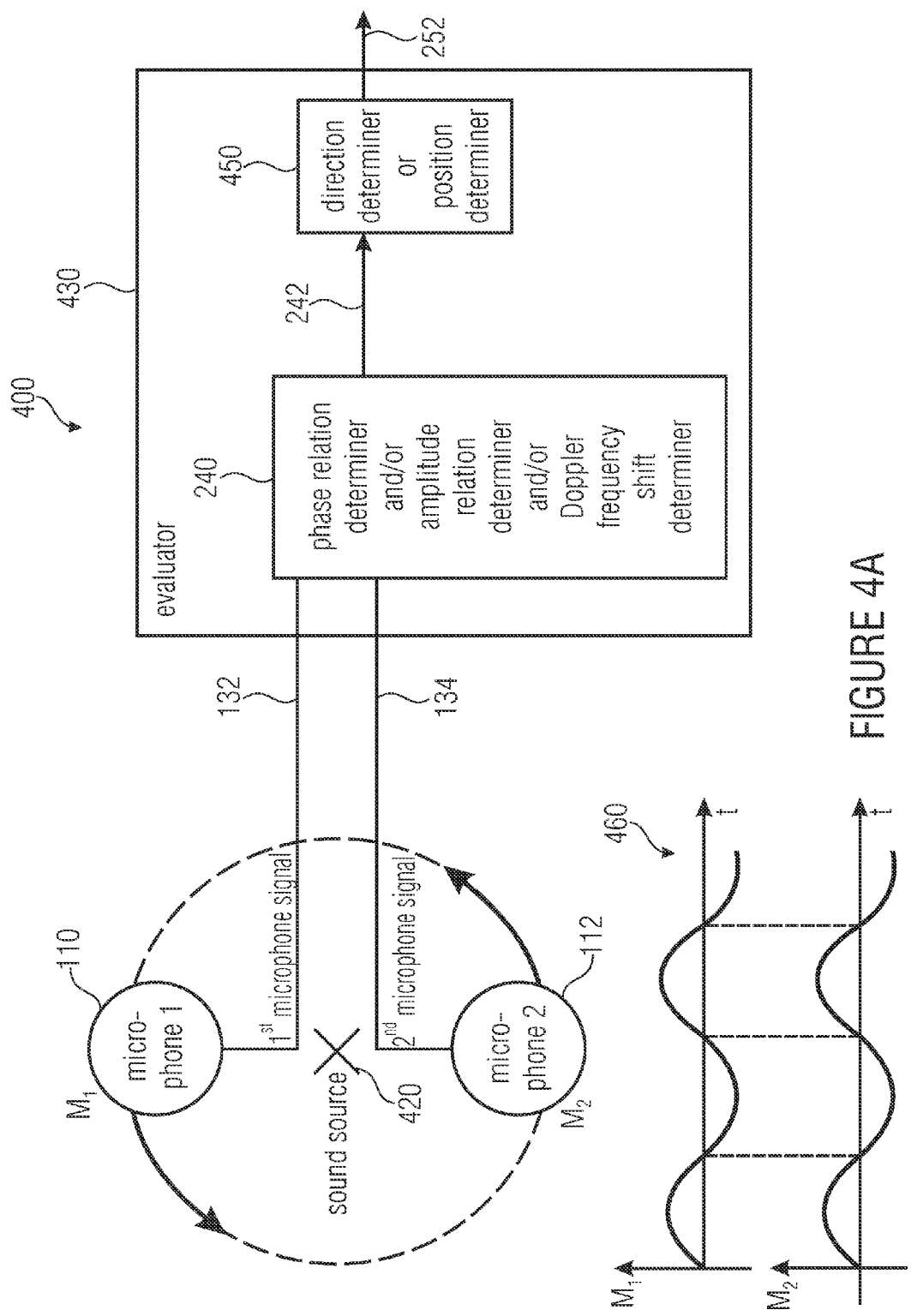
FIG. 4a is a block circuit diagram of an apparatus for localizing a sound source, according to a further embodiment of the invention, wherein the sound source is at the center of a rotation.
Figure 4B:
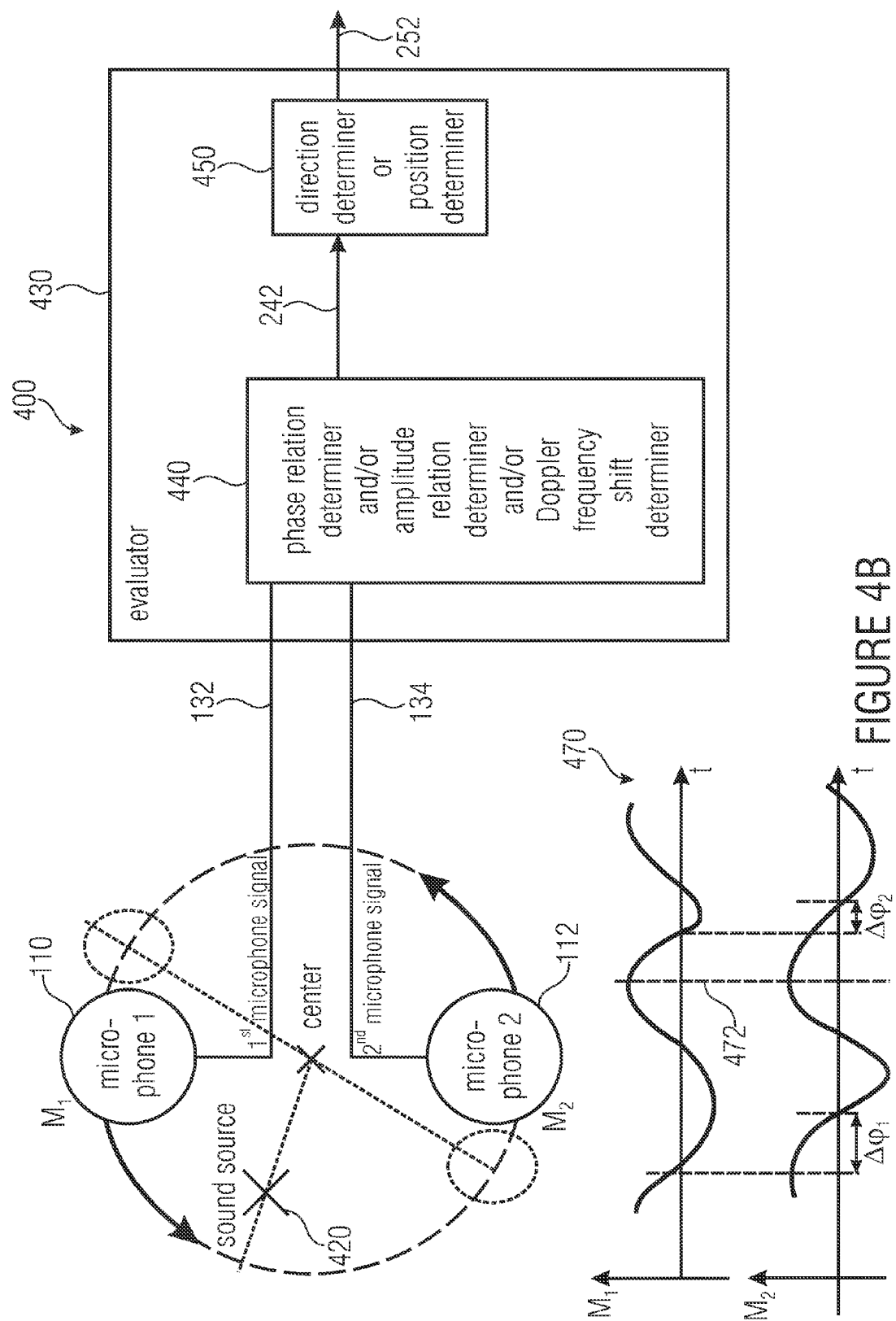
FIG. 4b is a block circuit diagram of an arrangement for localizing a sound source, according to an embodiment of the invention, wherein the sound source is off the center of the rotation.

FIGS. 4a and 4b show such an arrangement 400, which is very similar to the arrangement 200 according to FIG. 2. The difference lies in the position of the sound source.

The apparatus 400 may, however, comprise an evaluator 430 instead of the evaluator 230. The evaluator 430 may, for example, comprise an information extractor 440 which provides information 242. The information extractor 440 may, for example, be similar to the information extractor 240 and/or comprise its functionality. The information extractor may, however, also have an altered or extended functionality, as will still be explained in the following. The evaluator 430 may further comprise a direction determiner or position determiner 450, which is formed to provide directional information or positional information on the basis of the information 242 extracted by the information extractor 440.

The direction determiner or position determiner 450 may correspond to the above-described direction determiner or position determiner 250 in terms of its functionality, in some embodiments. In some other embodiments, the position determiner 450 may, however, comprise another or extended functionality as compared with the direction determiner or position determiner 450, as will be set forth in the following.

In FIG. 4a, there is shown an arrangement in which a sound source 420 is at a center of the rotation of the two microphones M1, M2, for example. Similar results are also obtained when the sound source, for example, is perpendicularly above or perpendicularly below the center of rotation of the microphones M1, M2, for example with respect to a plane in which the rotation of the microphones M1, M2 takes place.

If it is assumed that the sound source 420 sends out an approximately sinusoidal sound signal, for example, the microphone signals of the two microphones M1, M2 are of equal phase and have the same amplitude, as is shown at reference numeral 460, in the case of correspondingly equal sensitivities of the microphones M1, M2 (except for undesired reflections). FIG. 4b shows the arrangement 400, but with the sound source being off the center of the rotation of the microphones M1, M2. The microphone signals of the first microphone M1 and the second microphone M2 are shown exemplarily at reference numeral 470.

The graphical illustrations at reference numerals 460, 470 each show the microphone signals of the two microphones M1, M2 as a function of time. While neither a phase shift between the microphone signals of the microphones M1, M2, nor a temporal amplitude variation of the microphone signals of the microphones M1, M2, nor a Doppler frequency shift of the microphone signals are present in the arrangement according to FIG. 4a, all three effects mentioned occur in the arrangement according to FIG. 4b.

On the one hand, for example, a distance between the sound source 420 and the first microphone M1 changes during rotation of the first microphone M1. Furthermore, the rotation of the first microphone M1, for example, comprises portions during which the first microphone M1 moves toward the sound source 420 and during which the frequency of the microphone signal of the first microphone M1 is increased as opposed to the frequency emitted from the sound source 420. Moreover, portions of the rotation of the first microphone M1 occur, during which the first microphone M1 moves away from the sound source 420, so that the frequency of the microphone signal of the first microphone M1 is reduced as compared with a frequency of the signal emitted by the sound source 420. Besides, a time-variable phase shift between the microphone signals of the microphones M1, M2 occurs additionally. For example, if the distance of the two microphones M1, M2 to the sound source 420 is approximately equal, the microphone signals of the two microphones M1, M2 are in phase. The corresponding state is shown at reference numeral 472 in the schematic illustration, for example.

In the following, with reference to FIGS. 5 and 6, various states, as well as the accompanying characteristics of the microphone signals, will be described. Additionally, it will be illustrated how evaluation may be done by the direction determiner or position determiner 450 on the basis of the microphone signals.

Figure 5A:
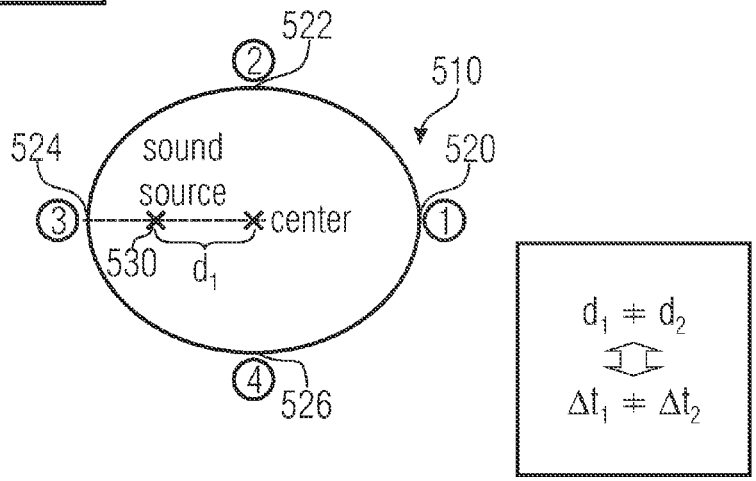
FIGS. 5a and 5b are schematic illustrations of a course of a Doppler shift along a path for two different positions of the sound source off the center of the rotation.
Figure 5A:
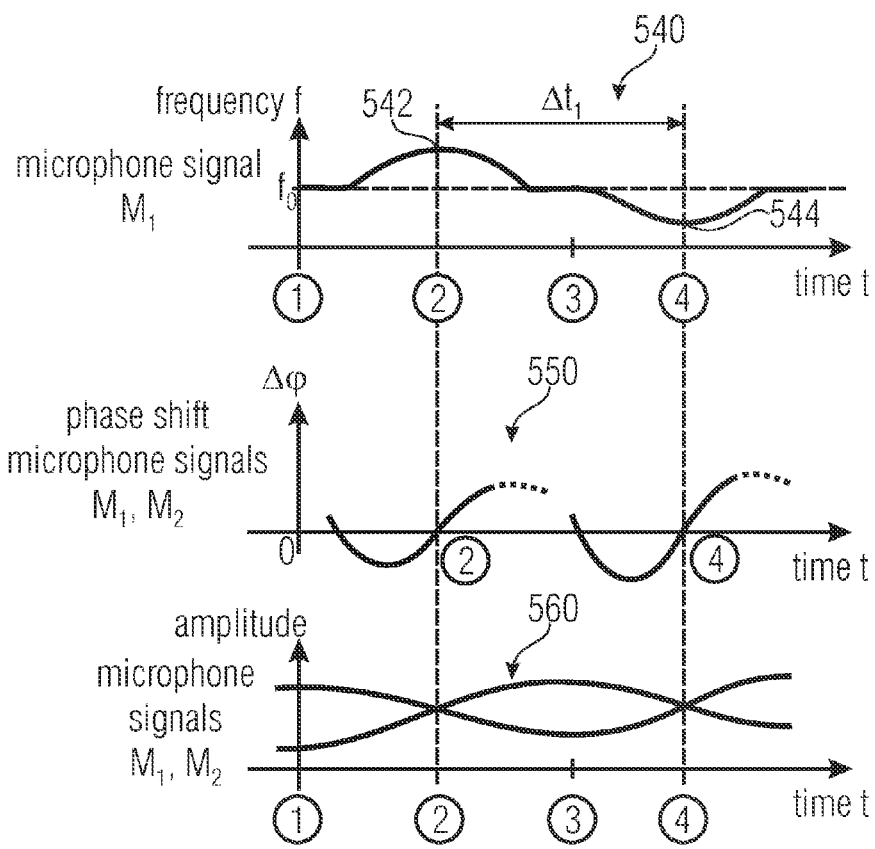
Figure 5B:
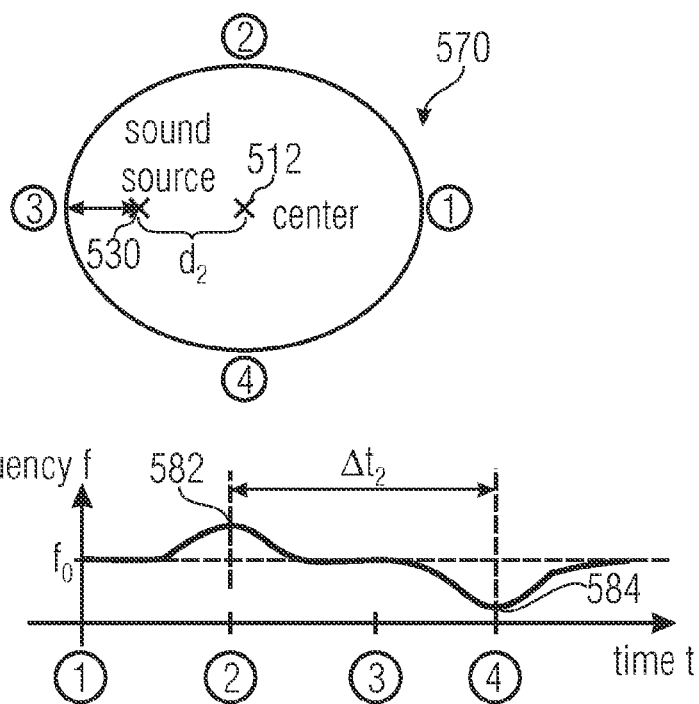

FIG. 5 shows a schematic illustration of a path of a microphone moving, for example, along a circular path around a center 512, at reference numeral 510. For the following explanations, it will be assumed that the microphone first is at a first position 520 and then proceeds to a second position 522, to a third position 524, and finally to a fourth position 526. Furthermore, it will be assumed that the microphone then again returns to the first position 520 with the entire motion sequence possibly taking place in a continuous circular motion. A sound source 530 may, for example, be at a distance d1 to the center 512 of the circular motion of the first microphone M1.

A schematic illustration of reference numeral 540 describes a temporal course of a frequency of the microphone signal provided by the microphone, wherein it is assumed, for example, that the sound source 530 sends out a sinusoidal signal of a fundamental frequency f0. For example, a Doppler frequency shift of the microphone signal may be negligible with respect to the frequency of the sound signal sent out by the sound source 530 if the first microphone M1 is at the first position 520. When the first microphone M1 moves from the first position 520 to the third position 524, it increasingly approaches the sound source 530. Thus, what is obtained is an increase in the frequency of the first microphone signal with respect to the frequency sent out by the sound source. The frequency shift, for example, has a maximum at reference numeral 542. In the movement of the first microphone from the third position 524 to the first position 520, the first microphone M1, for example, moves away from the sound source 530 (i.e. the distance between the sound source 530 and the first microphone M1 increases). Consequently, the frequency of the microphone signal decreases, as is shown in the schematic illustration at reference numeral 540. The frequency of the first microphone signal, for example, reaches a minimum 544. A time duration between the maximum 542 of the Doppler frequency shift and the minimum 544 of the Doppler frequency shift is designated with Δt1, for example. The time duration Δt1 carries information on a position of the sound source 530, for example. In addition, an amplitude of the frequency shift also carries information on the position of the sound source.

Furthermore, it is to be noted that also further information may be evaluated in an arrangement with two microphones. For example, if it is assumed that an apparatus for localizing the sound source 530 comprises two microphones M1, M2, which lie opposite to each other with respect to the center 512 of the rotation, for example, also a phase shift between a first microphone signal from the first microphone M1 and a second microphone signal from the second microphone M2 carries information on a position of the sound source 530. For example, if a distance between the sound source and the first microphone M1 is equal to a distance between the sound source 530 and the second microphone M2, a phase shift between a first microphone signal, which is provided from the first microphone M1, and the second microphone signal, which is provided from the second microphone M2, is at least approximately equal to zero. For example, if the first microphone M1 is at the second position 522, it can be assumed that the second microphone M2 is at the fourth position 526. In this case, the first microphone M1 and the second microphone M2 are at equal distance to the sound source 530, and a phase shift between the accompanying microphone signals equals zero, for example. The corresponding situation is shown, for example, at reference numeral 550 in a schematic illustration.

Besides, it is to be noted that the amplitudes of the microphone signals also vary with the position of the microphones M1, M2 along the rotation around the center 512. This is shown as reference numeral 560 in a schematic illustration. If the first microphone M1 and the second microphone M2 are at equal distance to the sound source 530, which is, for example, the case if the first microphone M1 is at the second position 522 or at the fourth position 526, the amplitudes of the microphone signals provided by the two microphones M1, M2 are approximately equal, for example. In this respect, information on the amplitudes of the microphone signals M1, M2 may also be evaluated so as to obtain information on the position of the sound source 530.

For illustration, FIG. 5 shows a graphical illustration at reference numeral 570 of an arrangement in which the sound source 530 is at another distance d2 from the center 512 than in the arrangement illustrated at reference numeral 510. In other words, d1≠d2.

In a schematic illustration at reference numeral 580, a temporal course of the frequency of the microphone signal provided by the first microphone is shown. The frequency of the first microphone signal has a maximum 582 as well as a minimum 584. A time duration Δt2 between the first maximum 582 and the second maximum 584 here is different from the time duration Δt1. In other words, a time duration between a maximum and a minimum of the frequency of the first microphone signal is dependent on the position of the sound source 530, with otherwise equal basic conditions. A corresponding dependency of the time duration between the maximum and the minimum of the frequency of the microphone signal on the distance between the sound source 530 and the center 512 of the rotation may easily be determined on the basis of computations, simulations or measurements, which can be performed without any problems. In this respect, the time duration between a maximum of the frequency of the microphone signal and a minimum of the frequency of the microphone signal is a criterion on the basis of which information on a position of the sound source 530 may be obtained. Besides, the amplitude of the frequency change of the microphone signal with the time and/or with a change of the position of the microphone M1 is also another criterion that can be utilized when determining the position of the sound source 530.

In the following, yet another extreme case will be shown on the basis of FIG. 6. FIG. 6 shows the arrangement as already described on the basis of FIG. 5 at reference numeral 510. At reference numeral 540, the temporal course of the frequency of the microphone signal is shown, as has already been described on the basis of FIG. 5.

Figure 6:
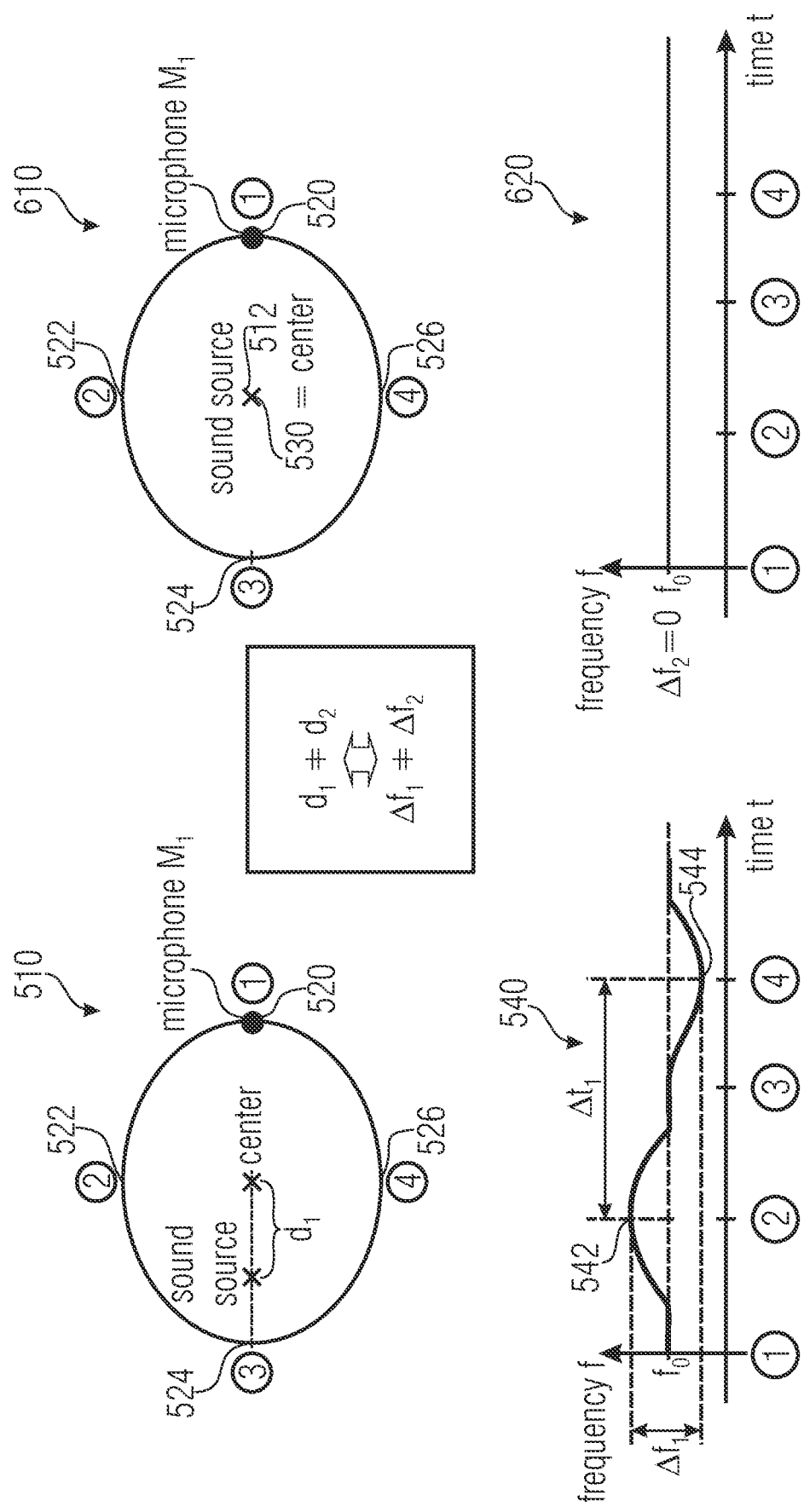
FIG. 6 is a schematic illustration of a course of a Doppler frequency shift depending on a path for the case that the sound source is off the center of the rotation and for the case that the sound source is at the center of the rotation.

Furthermore, FIG. 6 shows an arrangement in which the sound source 530 is at the site of the center of the rotation of the first microphone M1, at reference numeral 610. A schematic illustration at reference numeral 620 describes a frequency of the microphone signal of the first microphone M1 depending on the time and/or depending on the position of the first microphone M1. As can be seen from the schematic illustration 620, the frequency of the first microphone signal remains temporally unchanged. This results from the fact that the first microphone M1 is at the same distance from the sound source 530, in the arrangement according to the schematic illustration 610. In this respect, the first microphone signal has the same frequency as the sound signal emitted from the sound source 530. An amplitude of the Doppler frequency shift thus is equal to zero.

In this respect, it thus is apparent that the amplitude of the Doppler frequency shift provides for a statement regarding the position of the sound source 530. The closer the sound source 530 is to the center 512 of the rotation, the lower is the amplitude of the Doppler frequency shift, and vice versa.

In summary, it can thus be stated that the evaluator 430 is capable of extracting totally different information from the microphone signals 132, 134 and evaluating same individually or together for direction determination or position determination. The information on the Doppler frequency shift here is to be regarded as particularly important information, since both its amplitude and details regarding its time course carry information on the position of the sound source. The Doppler frequency shift determiner of the information extractor 440 may, for example, be formed to determine the amplitude of the Doppler shift of one or more of the microphone signals and provide information in this respect. Moreover, the Doppler frequency shift determiner may be formed to provide information on a temporal distance between two extreme values (e.g. between a minimum and a maximum) of the Doppler frequency shift to the direction determiner or position determiner 450. Alternatively or additionally, the Doppler frequency shift determiner may also be formed to evaluate a curve shape of the Doppler frequency shift, for example by means of pattern recognition and/or pattern comparison. Thus, the Doppler frequency shift determiner may, for example, comprise a plurality of comparison frequency shift curves and be formed to compare a currently measured time course of the Doppler frequency shift to several comparison curve courses, in order to determine which of the comparison curve courses is most similar to the currently measured time course of the Doppler frequency shift. Hence, the Doppler frequency shift determiner may be formed to provide corresponding information to the direction determiner or position determiner, in order to provide the same with information for the direction determination or position determination. The comparison time courses may, for example, be obtained by comparison measurements, simulations or computations.

Besides, the position determiner or direction determiner 450 may evaluate the information provided by the information extractor 440 for example with respect to time instants at which a phase shift between two microphone signals becomes zero, with respect to time instants at which amplitudes of two microphone signals are equal, with respect to an amplitude of a Doppler frequency shift, or with respect to a time course of the Doppler frequency shift, in order to obtain the information 252 on the position of the sound source or on the direction in which the sound source is located. The direction determiner or position determiner 450 may here, for example, but not necessarily, combine various pieces of the information mentioned. As already described above, for example information on the Doppler frequency shift may be used to decide at which zero crossing of a phase shift between the microphone signals of the microphones M1, M2 it can be assumed that the microphones M1, M2 have equal distance to the sound source. Based on the fact of at which temporal distance extremes of the Doppler frequency shift occur and/or on the fact of how great the amplitude of the Doppler frequency shift is, it may additionally be inferred where the sound source is located along a certain direction. The direction determiner or position determiner 450 may, for example, be formed to use first information (e.g. information regarding a phase shift between two microphone signals), in order to determine a first limitation regarding a position of the sound source or a direction from which the sound arrives. Moreover, the direction determiner or position determiner 450 may use second information (e.g. information regarding a Doppler frequency shift of a microphone signal or several microphone signals) so as to perform further limitation of the position of the sound source or a direction from which the sound arrives. Further information may optionally be used to determine and/or limit the position of the sound source even more accurately. For example, the position determiner may be formed to recognize that the sound source may be on various two-dimensional planes in space, on the basis of information on a zero position of a phase shift between two microphone signals (or on an orientation of the microphones when the zero position is present). On the basis of information indicating, for example, when a Doppler frequency shift has a maximum or a minimum value, it may then be determined on which of the several possible two-dimensional areas the sound source is located, by eliminating ambiguities regarding zero positions of the phase shift, for example. Furthermore, if an amplitude of the Doppler frequency shift is evaluated, for example, it may be inferred at which height above or below a plane in which the microphones move the sound source is located, for example. Thus, the accuracy of the position determination or direction determination may again be improved. If even more information is evaluated, in some embodiments the position of the sound source or the direction from which the sound arrives can finally be limited to one single possible direction or one single possible direction.

Thus, there are various embodiments according to the invention which differ regarding which information from the above-described various pieces of information exactly is evaluated for position determination or direction determination. Besides, the embodiments differ regarding how much information is used and how exactly the position or direction is determined. In some embodiments, there may be so much information that the position would even be over-determined by the available information. In this case, the vast amount of information may, for example, be used to determine the position of the sound source (or the direction from which the sound arrives) in a particularly reliable way with the aid of methods for error minimization.

Depending on the requirements, the position determiner or direction determiner 450 may be formed to determine the position of the sound source by computations or by comparison of the information provided from the information extractor with various pieces of comparison information.

Figure 7:
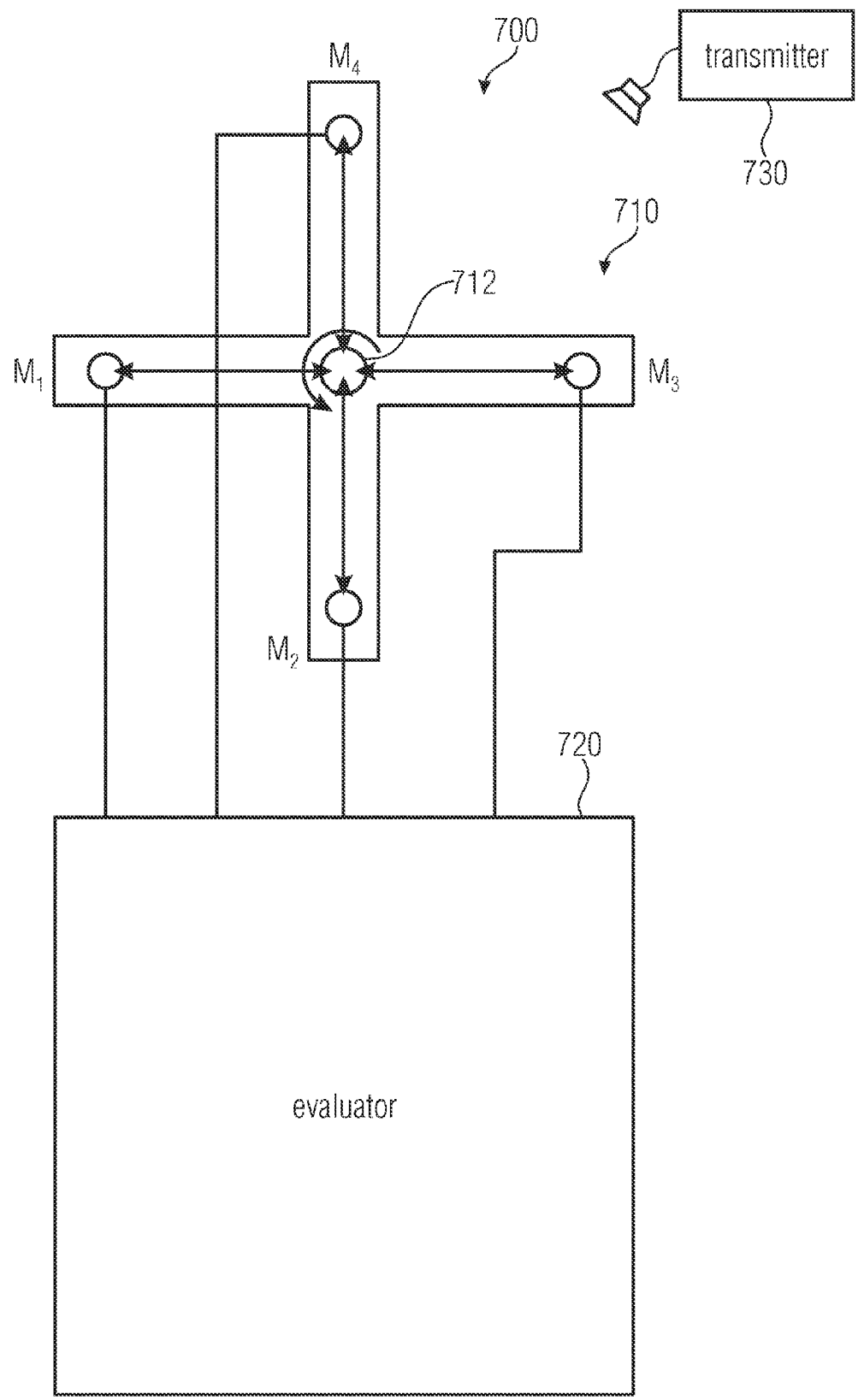
FIG. 7 is a block circuit diagram of an apparatus for localizing a sound source, according to a further embodiment of the invention.

In the following, a further embodiment according to the invention will be described with reference to FIG. 7. To this end, FIG. 7 shows a block circuit diagram of an apparatus for localization of a sound source, according to an embodiment of the invention. The apparatus according to FIG. 7 is designated with 700 in its entirety. The apparatus 700 includes a microphone arrangement 710 as well as an evaluator 720. The microphone arrangement 710 includes, for example, four microphones M1, M2, M3, M4, which are arranged so as to rotate around a center 712 of rotation, for example. The microphones M1 to M4 may, for example, be arranged on a cross-shaped carrier rotating about the center 712. However, other arrangements are also possible.

For example, the apparatus 700 may be formed to determine a position of a sound source 730 or to determine a direction from which a sound signal arrives from the sound source 730. The sound source 730 may, for example, be formed by an acoustic transmitter emitting an acoustic signal at a predetermined and known frequency.

Determination of the position of the transmitter 730, or at least of a direction in which the transmitter 730 is located as viewed from a location of the microphone arrangement 710, may for example be done by the evaluator 720 on the basis of microphone signals of the microphones M1 to M4.

In the following, details regarding the procedure when determining the position of the transmitter 730 or the corresponding direction from which sound signals arrive from the transmitter 730 will be described. Here, it is assumed that the frequency of the sound signals sent out from the transmitter 730 is known, for example. What is sought is, for example, a position of the transmitter 730. The position of the transmitter 730 may, for example, be described by three coordinates x, y, z. For example, if one of the coordinates of the transmitter 730, for example a z coordinate, is known, however, the position of the transmitter may also be described by two unknown coordinates, for example x and y. In some embodiments, it may be sufficient to determine a direction in which the transmitter is located, as viewed from the position of the microphone arrangement 710, for example. Depending on the fact of whether further information on the position of the transmitter is known, this direction may also be described by an angular coordinate or by two angular coordinates.

In some embodiments, various parameters of the microphone arrangement 710 may be unknown or known with only little accuracy. This may, for example, occur if the microphone arrangement 710 is manufactured especially cheaply, so that greater tolerances may occur. In some embodiments, e.g. one or more of the following parameters may be unknown or only known with insufficient accuracy (at least prior to their indirect determination, using the microphone signals):

Sampling rate of a receiver sampling the microphone signals and supplying the same to the evaluator 720 in a sampled fashion, or a processing rate or processing speed of the evaluator 720.

In other words, it may, generally speaking, be unknown how many samples of a microphone signal per second are provided to the evaluator 720, or how many samples per second the evaluator 720 can process. In the following, this unknown parameter will generally be referred to as "receiver-side sampling rate" or "sampling rate of receiver".

A rotational speed of a receiver: The rotational speed at which the microphones M1 to M4 rotate around the common rotation point 712 may be unknown, for example.

In some embodiments, the rotational speed of the microphones can be determined by specially provided sensors. In other embodiments, however, the rotational speed of the microphones M1 to M4 may be determined by way of evaluation of the corresponding microphone signals, for example in the evaluator 720, without requiring further additional rotational speed sensors.

A distance of the microphones from the center or from the common rotation point 712: In some embodiments, for example, a manufacturing tolerance of the microphone arrangement may be so large that an exact position of the microphones M1 to M4 is not known. In some embodiments, for example, a distance of the microphones M1 to M4 from the common rotation point 712 is not or not exactly known. Instead of an exact measurement by mechanical measuring devices, for example the distance of the microphones M1 to M4 from the common rotation point 712 can be determined by way of evaluation of the microphone signals, for example in the evaluator 720.

In addition to the mentioned unknown parameters of the arrangement 700 themselves, also a speed of sound, i.e. a velocity at which sound waves propagate, may be unknown. The speed of sound, for example, varies depending on air pressure and temperature. Instead of separate measurement of the speed of sound, the microphone signals of the microphones M1 to M4 can be evaluated so as to determine the speed of sound.

In the following, details of a further embodiment will be described. In an embodiment of the invention, four microphones M1 to M4 rotate as a cross around a center 712. A transmitter 730 transmits a frequency. The apparatus 700 thus allows for localization (for example a determination of a direction) of the transmitter 730 from the four microphone signals of the microphones M1 to M4.

In some embodiments, a frequency of the transmitter (sometimes also briefly designated with P0) is known. A position of one or more sound sources, which may also be described by coordinates x0, y0, is sought.

In some embodiments, various parameters are unknown, for example the following parameters:
P1: sampling rate of receiver;
P2: rotational speed of receiver;
P3: distance of the microphones M1 to M4 from the center 712; and
P4: speed of sound.

In the following, on the basis of FIG. 8, it will be described how the unknown parameters P1 to P4 can be determined, for example, on the basis of the microphone signals. In other words, on the basis of FIG. 8, it will be described what computations can be performed to determine the parameters P1 to P4.

The determination of the parameters P1 to P4, as will be described in the following, as well as the determination of the position of the sound source or the direction from which a sound signal arrives, may for example be done by the evaluator 720.

Figure 8:
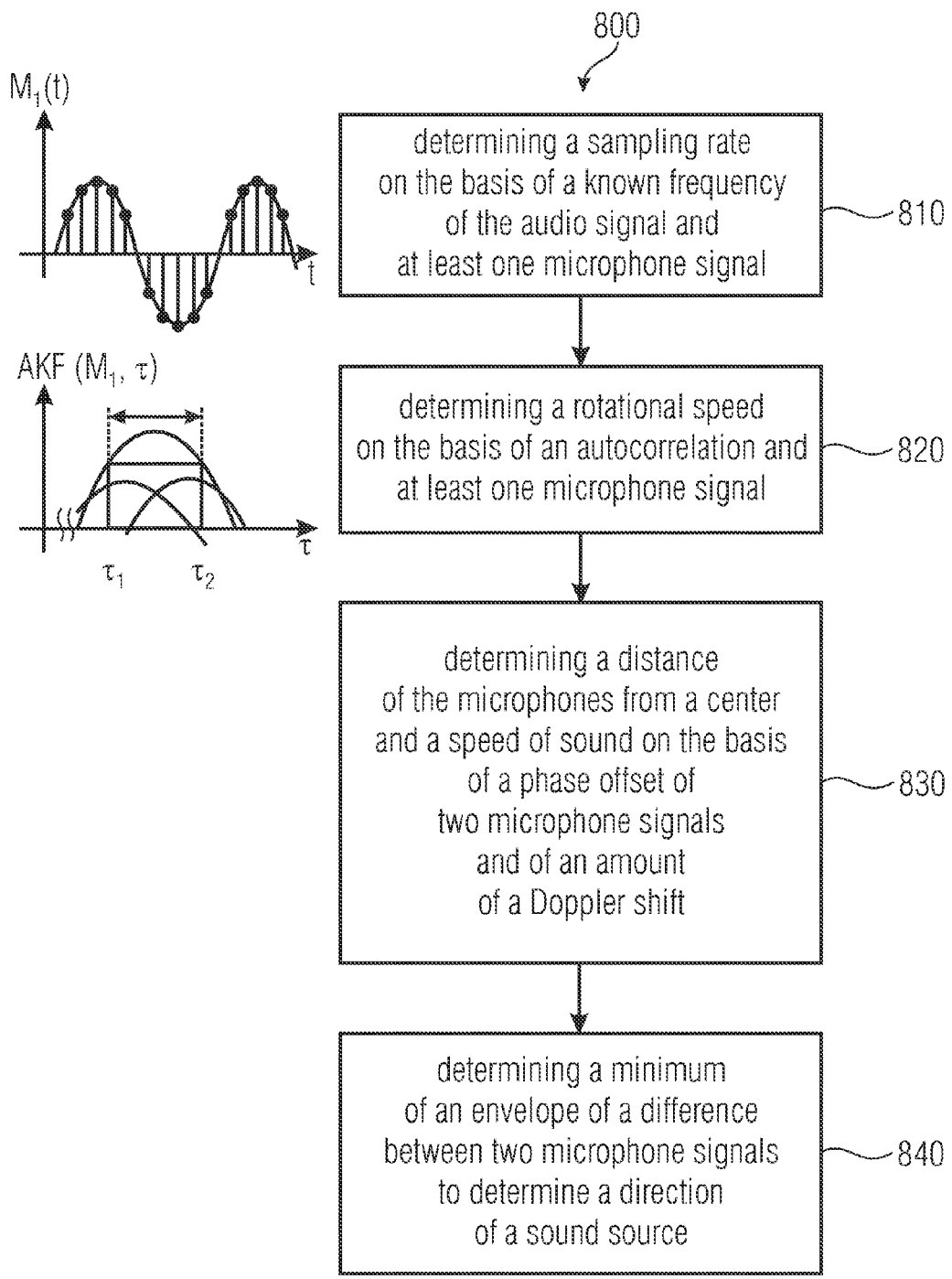
FIG. 8 is a flow chart of a method of localizing a sound source, according to a further embodiment of the invention.

FIG. 8 shows a flowchart of a method of determining unknown parameters as well as of determining information on a position (or direction) of a sound source. The method according to FIG. 8 is designated with 800 in its entirety. The method 800 includes, in a first step 810, determining a sampling rate at which one or more microphone signals are sampled, based on a known frequency of the sound signal or audio signal and at least one microphone signal. For example, if a sampled version of the microphone signal from one of the microphones M1 to M4 is present, which was generated by sampling the microphone signal at an unknown or not exactly known sampling rate, the sampling rate may be determined based thereon. For example, it may be evaluated how many samples there are included in one period of the audio signal. For example, if it is recognized that a period of the audio signal is represented by n samples, it can be inferred therefrom that the time duration between two samplings is one n-th of a period duration of the audio signal. If the frequency of the audio signal, and hence also the period duration of the audio signal, is known, it can be inferred how great a time interval is between two successive samples. Correspondingly, the sampling rate can be determined as the inverse of this time duration between two successive samples.

Hence, it is to be noted that the sampling rate with which one or more of the microphone signals are sampled can be determined in the step 810. This is particularly advantageous if the apparatus 700 is realized with very inexpensive components which do not allow for exact predetermination of the sampling frequency, or if very high precision is demanded.

The method 800 further includes, in a step 820, determining a rotational speed on the basis of an autocorrelation of at least one microphone signal. In some embodiments, the microphone signal can indeed be expected to repeat after a full revolution of a microphone around a rotation point 712 in an identical or at least almost identical manner. If it is assumed that, for example, the sound source remains substantially unchanged throughout several revolutions of a microphone M1, i.e. neither its position nor the selected audio signal changes fundamentally, it can be determined at which rotational speed the microphone M1 is rotating by performing an autocorrelation of the microphone signal. When calculating an autocorrelation function, figuratively speaking, one determines a measure of how great a match is between a microphone signal and a temporally shifted copy of the microphone signal. If there is a sufficiently great match between the microphone signal and the temporally shifted copy of the microphone signal, it can be assumed that the microphone has again returned to its original position during a timeframe equal to the time shift. Thus, the rotational speed of the microphone can be determined by correspondingly performing the autocorrelation function. Particularly high reliability of the autocorrelation function is obtained by receiving the microphone signal while the microphone is moving (continuously, for example). The Doppler frequency shift of the microphone signal resulting therefrom leads to the fact that the autocorrelation of the microphone signal assumes a particularly high value (e.g. greater than a given threshold value) only if the microphone, the microphone signal of which is used for the computation of the autocorrelation, has rotated further a full revolution (or several full revolutions) as opposed to an initial state at the time instant at which the autocorrelation function is evaluated. In other words, an autocorrelation and/or autocorrelation function of a microphone signal comprises periodic correlation maxima. A temporal distance between two successive correlation maxima corresponds to a period duration during which the microphone arrangement has rotated 360 degrees once.

The method 800 further includes, in a step 830, determining a distance of the microphones from a center and a speed of sound, based on a phase offset of two microphone signals and on an amount of a Doppler frequency shift. For example, a phase offset between signals of two microphones in line with the sound source is dependent both on the distance of the microphones from the rotation point or rotation center and on the speed of sound. For example, if it is assumed that two opposite microphones (for example the first microphone M1 and the third microphone M3) provide microphone signals with a maximum phase offset when the two microphones mentioned are "in line" with the sound source, this maximum phase offset can be determined. The maximum phase offset indicates how great a distance is between the opposite microphones mentioned (e.g. microphones M1, M3) as compared with the wavelength. Thus:

$$\Delta\phi max = 2\pi d_{M1-M3} f/c,$$

wherein $\Delta\phi max$ designates a maximum phase offset between the microphone signal of the first microphone M1 and the microphone signal of the third microphone M3, wherein $d_{M1-M3}$ describes a distance between the first microphone M1 and the third microphone M3, wherein f describes a frequency of the sound signal sent out from the sound source, and wherein c describes a speed of sound. If it is assumed that the maximum phase shift, as well as the frequency f are known, the equation mentioned includes two variables, namely the distance $d_{M1-M3}$ of two opposite microphones and the speed of sound c.

Furthermore, if an amplitude of a Doppler frequency shift of a microphone signal is known, the following applies:

$$\Delta f_{Doppler} = \omega d_{M1-M2}/c.$$

Here, $\Delta f_{Doppler}$ designates an amplitude of the Doppler frequency shift, and $\omega$ designates an angular frequency of the rotation of the microphones.

Based on the two above-mentioned equations, the ratio between a distance $d_{M1-M2}/c$ between a distance of two opposite microphones and the speed of sound c can be determined rather precisely. The ratio mentioned can be determined both based on the phase offset between signals of two microphones in line with the sound source and also based on the maximum Doppler shift of a microphone signal.

In summary, it thus is to be stated that, based on a knowledge of the frequency of the audio signal emitted from the sound source, a sampling rate of the receiver (i.e. the rate at which one or more of the microphone signals are sampled) can be determined. Based on an autocorrelation function of a microphone signal, a rotational speed of the microphone arrangement can also be determined. A phase offset between signals of two microphones in line with the sound source may, for example, be evaluated to determine the ratio dM1-M2/c. An amplitude of a Doppler frequency shift of a microphone signal may be utilized additionally here, e.g. to eliminate or resolve ambiguities.

Hence, in some embodiments, it is possible to determine important parameters of the microphone arrangement on the basis of only knowledge of a frequency of the sound signal sent out from the sound source.

The method 800 further includes, in a fourth step 840, determining a minimum of an envelope of a difference between two microphone signals, in order to determine a direction of a sound source.

With reference to the arrangement 700 according to FIG. 7, for example, a difference between a microphone signal of two opposite microphones can be formed by the evaluator 700. For example, the evaluator may be formed to form a difference between a microphone signal of the first microphone M1 and a microphone signal of the third microphone M3. As an alternative thereto, the evaluator may also be formed to form a difference between the microphone signal of the second microphone M2 and the microphone signal of the fourth microphone M4. An envelope of this difference signal comprises, for example, a local minimum, if two opposite microphones are "in line" with the sound source. However, the envelope of the difference signal has a local maximum in some embodiments if the two opposite microphones M1, M3 (or M2, M4) are both approximately at the same distance from the sound source. This fact results from the Doppler frequency shift. If the two opposite microphones M1, M2 are "in line" with the sound source, the Doppler frequency shifts are minimal, and the signals arriving at the opposite microphones M1, M3 have maximum similarity. If the two opposite microphones are not "in line" with the sound source, however, the Doppler frequency shift leads to the fact that the signal from the first microphone M1 is shifted in frequency as opposed to the signal from the opposite microphone M3. Correspondingly, the microphone signals from the two opposite microphones M1, M3 are not sufficiently similar to each other. A difference signal between the microphone signals of the microphones M1, M3 therefore has quick oscillation, the reason for which is to be seen in the Doppler frequency shift. Correspondingly, the envelope has a local maximum.

Thus, while the envelope of the difference signal would have a local minimum without the presence of the Doppler frequency shift, if both opposite microphones are approximately at the same distance from the sound source, the Doppler frequency shift leads to the fact that a local maximum of the envelope develops exactly in this state.

Due to the utilization of the Doppler effect it thus is effected that reliable detection of a direction in which the sound source is located is enabled in some embodiments of the invention. While conventionally, for example, minima of a difference signal between microphone signals of opposite microphones occur both when the opposite microphones are arranged "in line" with the sound source and when the two microphones have approximately the same distance of the sound source, the Doppler frequency shift, which is utilized in some embodiments of the invention, causes the difference signal to have a maximum when the two microphones are approximately at the same distance from the sound source.

In some embodiments, the inventive concept also is applicable if the sound source does not emit a narrow-band signal, but rather a wide-band signal. A local minimum of an envelope of the difference signal of two opposite microphones also occurs in the emission of the wide-band signal if the two opposite microphones are "in line" with the sound source. On the other hand, in some embodiments, the employment of a sound source emitting a narrow-band signal, i.e. for example an approximately sinusoidal signal, is possible. Thus, embodiments according to the invention are suited for employment in connection with a multiplicity of possible sound sources.

Besides, it is also to be pointed to the fact that, in some embodiments of the invention, it is sufficient to use two microphones instead of four microphones. If four microphones are employed, it is possible to achieve particularly high precision by performing the first position determination, using two microphone signals from two opposite microphones, and further by performing a second position determination, using microphone signals from two further opposite microphones. The result of the first position determination may then be combined with a result of the second position determination, in order to bring about minimization of an error, for example.

In the following, with reference to FIGS. 9a to 9g, 11 and 12, various arrangements of microphones will be described. To this end, FIGS. 9a to 9g show schematic illustrations of arrangements of two or more microphones.

Figure 9A:
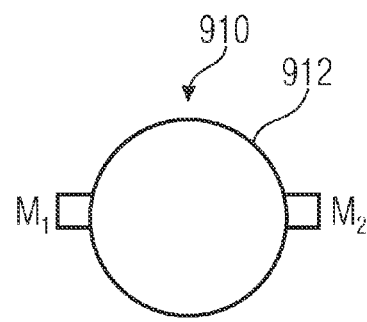
FIGS. 9a to 9g are schematic illustrations of various possibilities of arranging microphones, according to embodiments of the invention.

FIG. 9a shows a schematic illustration of a first arrangement 910. A first microphone M1 and a second microphone M2, for example, are arranged in opposite fashion at a surface of a sphere 912. The two microphones may, for example, be attached at the surface of the sphere. In another embodiment, the microphones may, however, also be inserted into the sphere 912.

Figure 9B:
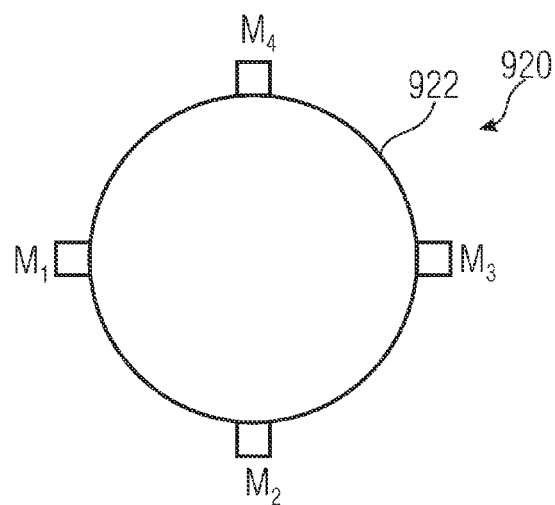

FIG. 9b shows a schematic illustration of a further arrangement 920. Two or more microphones M1 to M4 are arranged on a disc, for example. For example, two microphones M1, M3 may be arranged to be opposite, with respect to a center point of the disc 922. Two further microphones M2, M4 may also be arranged to be opposite, with respect to the center point of the disc 922. The microphones may, for example, be attached on the surface of the disc. Exemplarily, all microphones M1 to M4 may be attached on an upper or lower surface of the disc. In a further embodiment, all microphones M1 to M4 may be arranged on a lateral surface of the disc 922. In further embodiments, the microphones M1 to M4 may be sunk into the disc 922.

Figure 9C:
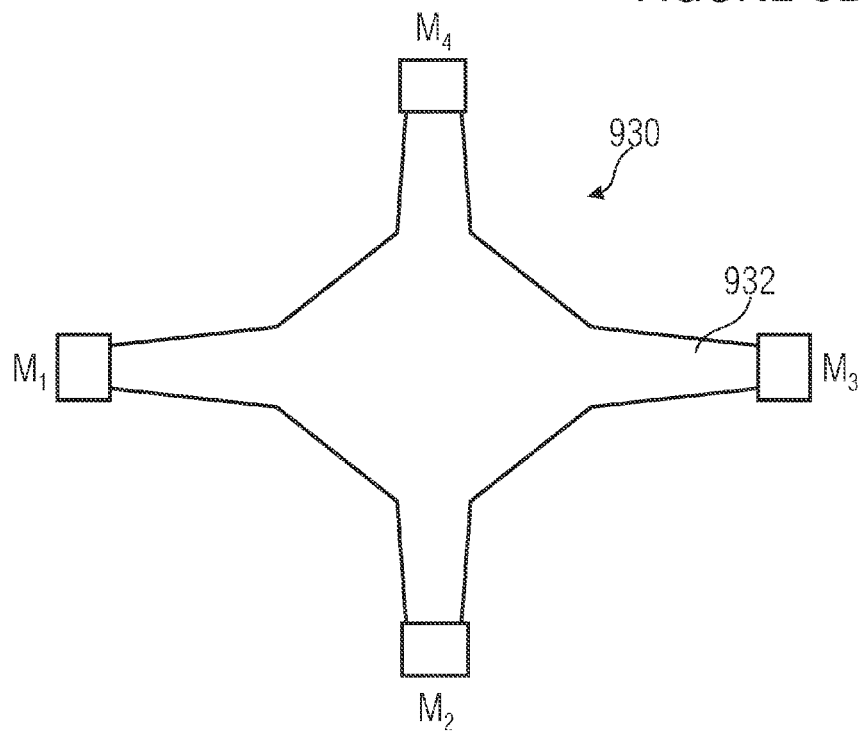

FIG. 9c shows a schematic illustration of a further arrangement 930 of microphones. The arrangement 930 includes a star-shaped carrier 932 comprising a plurality of "spikes". Two or more microphones M1 to M4 are arranged at the various "spikes" of the star-shaped carrier 932, for example. Two of the microphones each may, for example, lie opposite each other with respect to the center of the star-shaped carrier 930. The microphones may again all be arranged on the same main surface of the star-shaped carrier 932. The microphones M1 to M4 may, however, also be oriented in various directions, for example away from the center of the star-shaped carrier 932. The microphones M1 to M4 may be arranged on the surface of the star-shaped carrier 932 or be sunk into the star-shaped carrier 932.

Figure 9D:
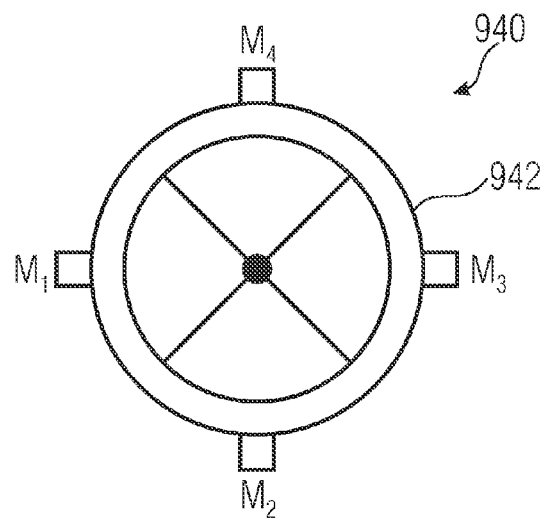

FIG. 9d shows a schematic illustration of a further arrangement of the microphones M1 to M4. For example, the microphones may be attached in or on a pivoted ring 942, as is shown in FIG. 9d. The microphones may all be arranged on a common main surface of the ring 940, and thus be oriented in the same direction. However, the microphones may also be arranged on a surface of the ring to point in different directions each.

Figure 9E:
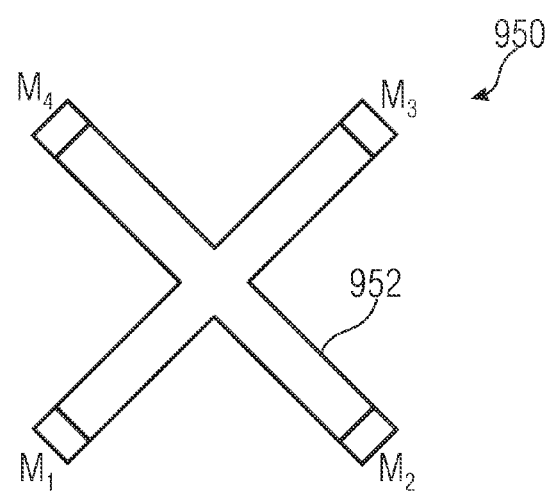

FIG. 9e shows a schematic illustration of an arrangement 950 of microphones in or on a cross-shaped carrier 952. Regarding the possibilities of arranging the microphones, reference is made to the above explanations.

Figure 9F:
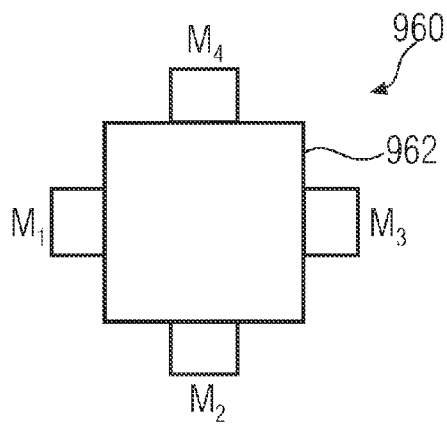

FIG. 9f shows an arrangement of microphones on a gyroscope 962. The gyroscope may, for example, be formed to sense information on rotations, for example with comparably high precision. The microphones M1 to M4 may, for example, be attached at the surface of the gyroscope 962. The microphones M1 to M4 may, however, also be sunk in recesses of the gyroscope 962. Of course, the microphones M1 to M4 may, however, also be arranged in a spaced manner from the gyroscope 962, but connected to the gyroscope 962. A corresponding evaluator may, for example, evaluate positional information provided from the gyroscope 962, which describes the location or orientation of the microphones M1 to M4 with comparably high accuracy, for example. The corresponding evaluator may thus combine the location information or positional information provided from the gyroscope 962 regarding the microphones M1 to M4 with the microphone signals provided from the microphones M1 to M4 (or the information extracted therefrom), so as to determine the position of the sound source or a direction from which the sound arrives.

Figure 9G:
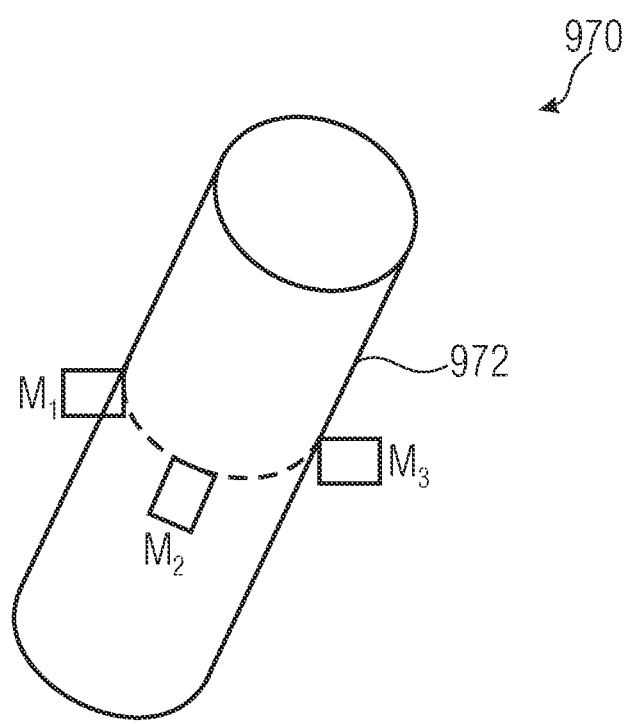

FIG. 9g shows a schematic illustration of a further arrangement 970 of microphones. The arrangement 970 includes a cylinder 972, at which the microphones are arranged, for example microphones M1 to M4. The microphones M1 to M4 may, for example, be arranged along a circle line on the barrel of the cylinder 972. The microphones may, for example, be arranged on a surface of the cylinder 972, be sunk in the cylinder 972, or be spaced from the barrel of the cylinder 972, for example by way of spacers.

Figure 10A:
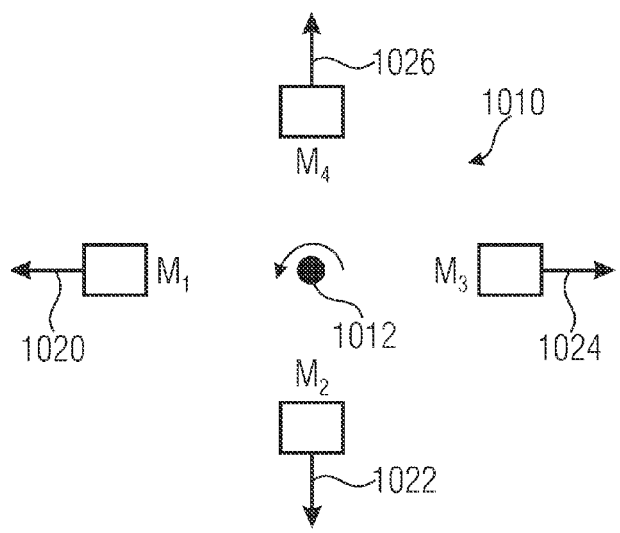
FIGS. 10a to 10c are schematic illustrations of different ways of arranging microphones, according to embodiments of the invention.
Figure 10B:
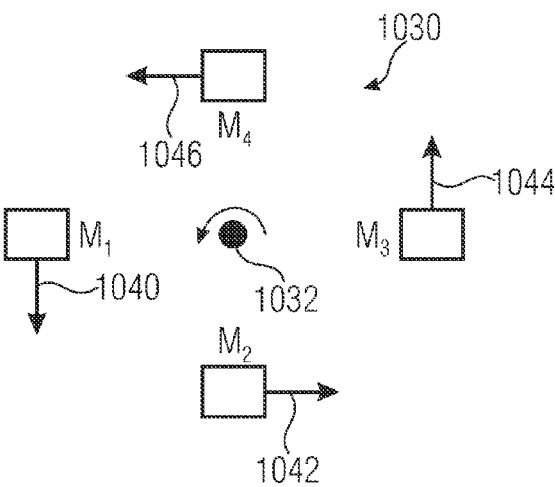
Figure 10C:
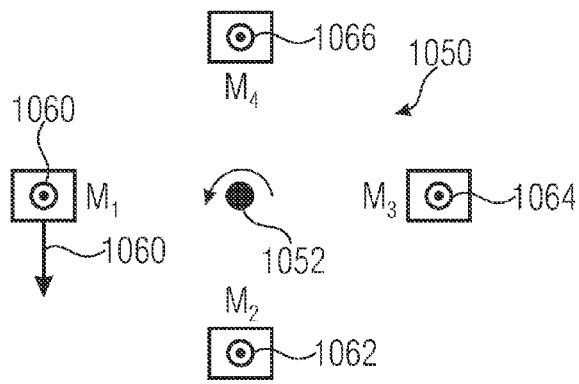

In the following, on the basis of FIGS. 10a to 10c, various orientations of the microphones will be described. FIGS. 10a to 10c show schematic illustrations of various orientations of microphones, according to embodiments of the invention.

FIG. 10a shows a first arrangement 1010 of the microphones. The microphones M1 to M4 may, for example, be arranged around a rotation point 1012. In the arrangement 1010, the microphones M1 to M4 may, for example, be arranged so that main sensitivity directions 1020, 1022, 1024, 1026 of the microphones point away from the rotation point 1012. If the microphones M1 to M4 perform rotation around the rotation point 1010, the main sensitivity directions of the microphones M1 to M4 are substantially perpendicular to the direction of movement of the microphones M1 to M4, for example.

FIG. 10b shows a further arrangement 1030 of microphones. The microphones M1 to M4 are again arranged around a rotation point 1032, for example. Main sensitivity directions 1040 to 1046 of the microphones M1 to M4 are oriented at least approximately tangentially with respect to a direction of movement of the microphones M1 to M4, for example. Thus, when the microphones M1 to M4 thus perform rotation, the main sensitivity directions of the microphones M1 to M4 correspond to the local direction of movement of the microphones M1 to M4 or are opposite to this local direction of movement, for example.

FIG. 10c shows a further arrangement 1050 of microphones M1 to M4. For example, the microphones M1 to M4 are arranged so as to perform rotation about a rotation point 1052. The microphones M1 to M4 move in a common plane in this rotation, for example. Main sensitivity directions 1060 to 1066 of the microphones M1 to M4 are oriented substantially perpendicularly to the plane in which the rotation takes place, for example.

Figure 11:
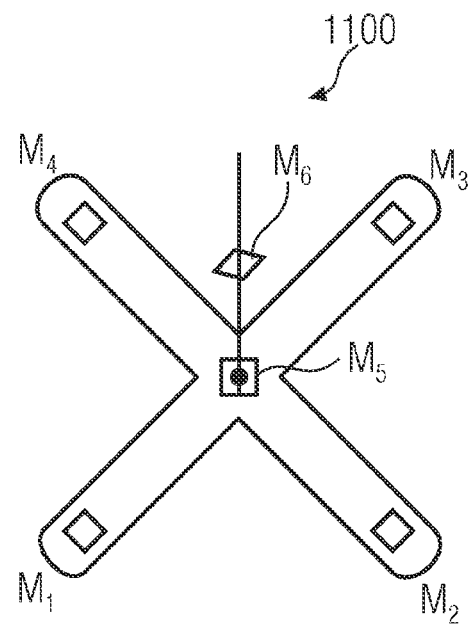
FIG. 11 is a schematic illustration of a way of arranging microphones, according to an embodiment of the invention.

FIG. 11 shows a schematic illustration of an arrangement of microphones. The arrangement according to FIG. 11 is designated with 1100 in its entirety. The arrangement according to FIG. 11, for example, includes the microphones M1 to M4, which are arranged on a cross-shaped carrier. The carrier carrying the microphones M1 to M4 may be pivoted. Hence, the microphones M1 to M4 may, for example, perform rotation around a common rotation point and/or around a common rotation center. For example, an optional further microphone M5 is arranged adjacent to the common rotation point (or immediately at the common rotation point). The microphone M5 may, for example, be arranged such that the microphone M5 is substantially stationary or moves at a lower speed than the microphones M1 to M4 when the microphones M1 to M4 are rotating. The microphone M5 may, for example, provide a further microphone signal, which can be employed for the evaluation of the microphone signals from the microphones M1 to M4.

The arrangement 1100 according to FIG. 11 may, besides, optionally (for example additionally to the microphone M5 or instead of the microphone M5) have a further microphone M6. The microphone M6 may, for example, be arranged above or below (or on the one side or on the other side) of a plane in which the microphones M1 to M4 perform rotational movement. Hence, if a sound source is above or below the plane in which the microphones M1 to M4 perform their rotation, for example, a phase shift between the microphone signal of the microphone M6 and the microphone signals of the microphones M1 to M4 develops, due to the location of the microphone M6 alone. Thus, an evaluator may, for example, obtain information as to whether a sound source is above or below the plane in which the microphones M1 to M4 perform rotation, by way of comparison of the phase location of the microphone signal from the microphone M6 and at least one further microphone signal from one of the microphones M1 to M4 and/or M5, for example.

Besides, it is to be noted that the use of the microphone M5 and/or the microphone M6 already makes sense, also in connection with only two microphones performing rotation, for example, in other words a microphone arrangement containing only two rotatable microphones may also optionally be improved by adding a microphone M5 and/or a microphone M6.

Figure 12:
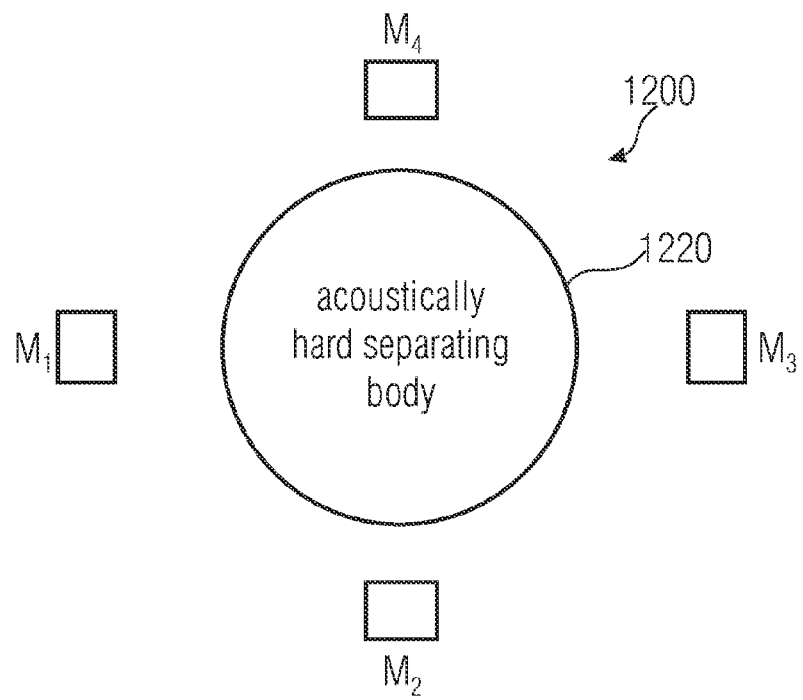
FIG. 12 is a schematic illustration of a way of arranging microphones, according to an embodiment of the invention.

FIG. 12 shows a schematic illustration of an arrangement of microphones separated by an acoustically hard separating body. The arrangement according to FIG. 12 is designated by 1200 in its entirety. The arrangement 1200 includes two or more microphones M1 to M4, which are arranged to be rotatable, for example. A carrier structure or support structure carrying the microphones M1 to M4 is not shown here for reasons of better overview. For example, an acoustically hard separating body is arranged between the microphones. The acoustically hard separating body, which may, for example, be formed as a sphere, is arranged between two opposite microphones, for example. The acoustically hard separating body 1220 may, for example, be arranged between the first microphone M1 and a microphone M3 opposite thereto. Furthermore, the acoustically hard separating body 1220 may be arranged between a second microphone M2 and a fourth microphone M4.

For example, if a microphone arrangement includes only two rotatably arranged microphones, the acoustically hard separating body may, for example, be arranged such that the acoustically hard separating body interrupts direct sound propagation from the first microphone (e.g. 111) to the second microphone (e.g. 113) opposite thereto. Depending on the wavelength of a sound signal, the acoustically hard separating body may represent attenuation and/or delay for a sound signal. Sound signals with small wavelength are reflected at the acoustically hard separating body, for example. Sound signals with greater wavelength, however, are diffracted by the acoustically hard separating body and propagate around the acoustically hard separating body 1220, for example. Thus, a runtime of microphone signals between two opposite microphones is increased by the acoustically hard separating body 1220, for example, which makes evaluation easier in some cases.

Figure 13:
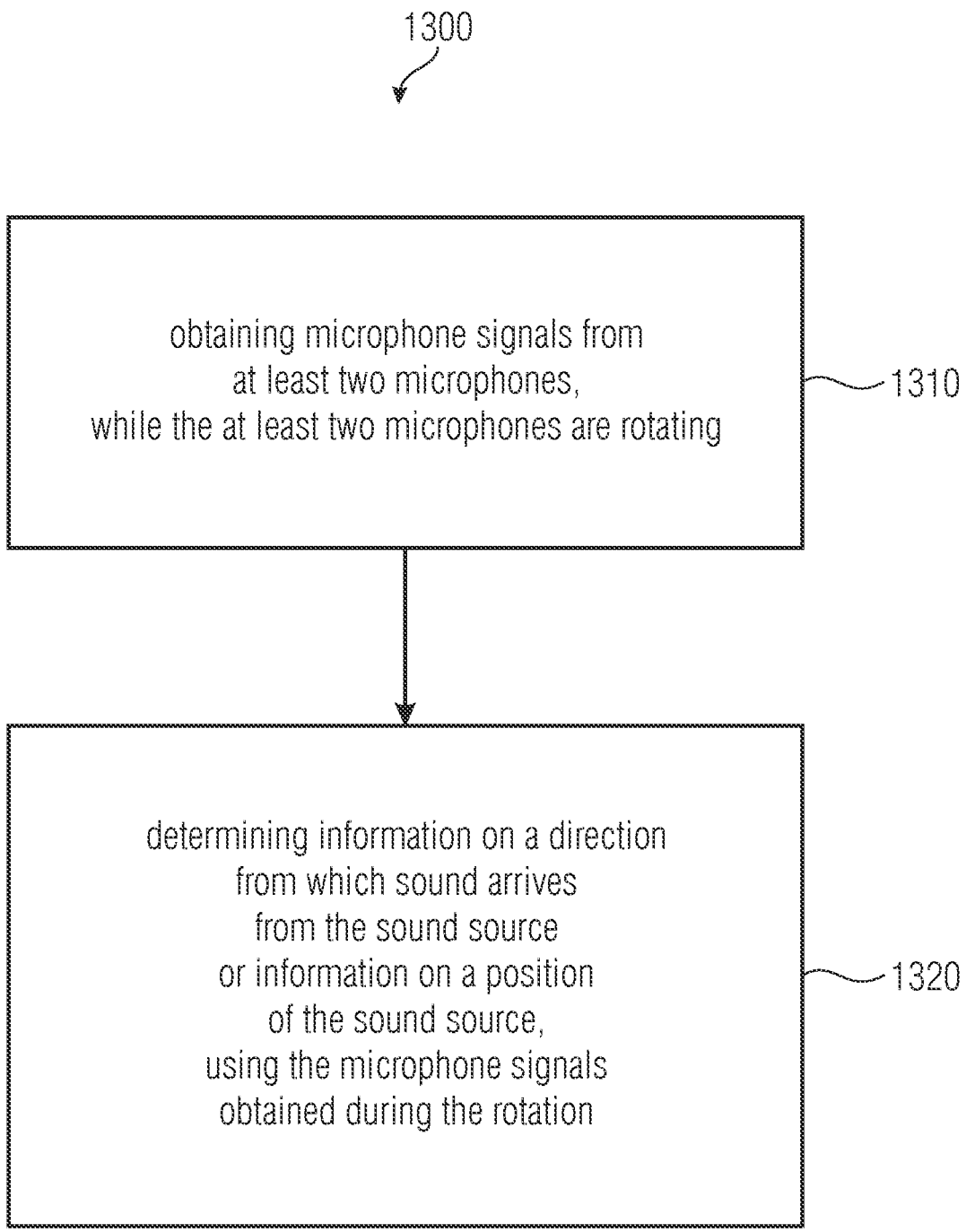
FIG. 13 is a flowchart of a method of localizing a sound source, according to an embodiment of the invention.

FIG. 13 shows a flowchart of a method 1300 for localizing a sound source. The method 1300 includes obtaining 1310 microphone signals of at least two microphones, while the at least two microphones perform a rotation. The method 1300 further includes determining 1320 information on a direction from which sound from a sound source arrives, or information on a position of the sound source, using the microphone signals obtained during the movement of the microphones.

The method 1300 may be supplemented by all those steps and features described herein. For example, determining 1320 information on a direction or information on a position may include one or more of the method steps 810, 820, 830, 840 according to FIG. 8.

In the following, some details with regard to some embodiments will be described.

Some embodiments according to the invention allow for measurement of a spatial impulse response with information regarding from which direction (x, y, z) which reflection comes from.

Some embodiments according to the invention allow for exact localization of sound sources. Some embodiments according to the invention, for example, allow for exact localization of loudspeaker arrangements (also referred to "loudspeaker setups") for multi-channel reproduction and wave field synthesis.

Some embodiments of the invention are based on the basic idea of moving two or more microphones continuously in a circle, with simultaneous measurement. With stationary and quasi-stationary test signals, a cyclical frequency shift occurs, for example. In the case of approach (for example of the microphones to a sound source), for example, an increase in the frequency occurs. When moving away (for example the microphones from the sound source), a decrease in the frequency occurs. In some embodiments, a maximum frequency shift occurs at source positions in a plane of the microphone rotation. In some embodiments, a smaller frequency shift dependent on an elevation angle is obtained in the case of source positions outside this plane (e.g. this height).

In some embodiments according to the invention, one or more of the following effects and/or advantages can be achieved:
  simultaneous measurement in all directions by way of rotation;
  balance of construction tolerances;
  enhancement of the measurement (e.g. of a signal-to-noise ratio, SNR) through addition of the measurement signals of several revolutions; in some embodiments, a result continuously becomes better depending on the measuring time;
  utilizing the Doppler effect for virtual enlargement of the diameter is possible, since several measurements also improve a signal-to-noise ratio;
  reduction of the measuring time, and hence also measurement in full auditoria is possible;
  measurement also is possible with arbitrary measurement signals by way of computational correlation of transmitted and received signals.

Some possibilities of improvement, which may optionally be employed to further enhance the apparatuses described herein, will be described in the following.

In some embodiments a direction may optionally be marked by one or more mechanical, optical or acoustical beacons. For example in an apparatus according to the invention, an acoustic beacon may be present in addition to the rotating microphone field. The combination of a microphone field and a beacon may, for example, be regarded as a direction measurement system. The beacon may, for example, be formed to emit an audio signal having certain properties, wherein the properties of the beacon audio signal for example are known to the microphone field (or the accompanying evaluator). The evaluator can thus determine from which direction a beacon microphone signal arrives and/or at which position the beacon is. The direction from which the beacon audio signal arrives, or the position of the beacon may, for example, be defined as a reference direction or a reference position. If the microphone field continues receiving a useful audio signal (i.e. an audio signal, the direction of incidence of which or the sound source position of which is to be determined), the evaluator may determine the direction from which the useful sound signal arrives, or the position of a useful sound source emitting the useful sound signal, with respect to the direction from which the beacon audio signal arrives or with respect to the position of the beacon. Hence, it is relatively simple to employ the microphone field in the practical application. Intensive calibration can be omitted. Rather, only a corresponding beacon has to be positioned at a desired location in a room. The evaluator may then indicate the direction information or the position information with respect to the direction or position of the beacon, without knowledge of how exactly the microphone is incorrectly mounted.

In some embodiments, however, it may also be helpful for the evaluator to additionally obtain information on a location of the beacon. Thereby, accuracy of the measurement may, for example, be improved, and the beacon may contribute to fine calibration, among other things.

In some embodiments, the two or more rotatably arranged microphones may be supplemented by a further microphone in z direction, which may, for example, be arranged either at the center of a (for example planar) microphone arrangement, or which may, for example, be arranged above the other microphones (or above a plane in which the other microphones are). The latter, for example, allows for simpler determination of the height of sound sources.

Without any additional microphone, in some embodiments, determination of the elevation angles for $\phi \neq +/-90°$ is possible by way of determination of a rotation direction. Exclusively flat fields (for example microphone fields) sometimes cannot distinguish elevation angles of $\phi=90°$ and $\phi=-90°$.

In other words, in a flat microphone field in which all microphones rotate about a rotation center in a common rotation plane, it cannot be distinguished in some cases whether a sound source is directly above the rotation center (with respect to the rotation plane) or exactly perpendicularly below the rotation center (with respect to the rotation plane). Such a directional discrimination may, for example, be enabled by the fact that there is at least one microphone, which is arranged above or below the common rotation plane of the at least two rotatably arranged microphones. The additional microphone may be arranged fixedly or rotatably. A phase comparison of the microphone signals of the additional microphone and the rotatably arranged microphones may, for example, provide information on the direction of the sound source.

For example, if two microphones are arranged so as to rotate about a rotation center in a common rotation plane, and a further microphone is arranged "above" the rotation plane (in general: on a first side of the rotation plane), it may thereby be discriminated whether a sound source is above (on a first side of) the rotation plane or below (on a second side of) the rotation plane. For example, if the sound source is above the rotation plane, a phase comparator, which may be part of the evaluator, for example, may recognize that a phase location of the microphone signal of the further microphone leads a phase location of the microphone signals of the microphones rotating in the rotation plane. Hence, the evaluator may provide information indicating that the sound source is above the rotation plane. However, if a phase location of the microphone signal of the further microphone lags behind a phase location of the microphone signals of the microphone rotating in the rotation plane, it can be inferred therefrom that the sound source is below the rotation plane, and the evaluator may provide corresponding information.

In the following, some improvements will be described, which may be employed in connection with two or more microphones, for example. For example, the microphones may be separated from each other by an acoustically hard separating body, e.g. a sphere.

Advantages of such an arrangement are shadowing at high frequencies and a greater temporal shift between the measurement signals (or microphone signals) of opposite microphones at low frequencies. By way of diffraction at the separating body, a detour by the factor Π/2 develops in some embodiments. The shadowing at high frequencies and the greater time shift between the measurement signals of opposite microphones at lower frequencies may, in some embodiments, be achieved without enlargement of the field or microphone field. In some embodiments, a decrease of undesired reflections at the construction is obtained as well.

In the following, an embodiment according to the invention will be illustrated briefly:

In the corresponding embodiment, for example, four microphones M1 to M4 rotate as a cross about a center. A transmitter transmits a frequency. Localization (e.g. determination of a direction) of the transmitter is done by way of the four microphone signals.

In one embodiment, the frequency of the transmitter, which is also referred to as a parameter P0, is known.

In this embodiment, the position of the sound source (or of several sound sources) is sought, which may be represented by x0 and y0, for example.

In the embodiment mentioned, for example, there are the following unknown parameters:
P1: sampling rate of receiver;
P2: rotational speed of receiver;
P3: distance of the microphones from the center; and
P4: speed of sound.

In the embodiment mentioned, the following computations may be performed:
I1: determine sampling rate of receiver P1 from P0 and signal of a microphone (possibly also using a word clock)
I2: determine rotational speed of receiver P2 from autocorrelation of one (or more) microphones (possibly also using or via a trigger signal or a beacon);
I3: phase offset between signals of two microphones in line with the source depends on P3 and P4; the corresponding orientation of the microphones is also referred to as "front fire" or "longitudinal fire";
I4: Doppler shift (minimum-maximum) of a microphone depends on: P2 (known), P3 and P4 ("broadside");
that is, if the relations I3 and I4 are used, the unknown parameters P1 to P4 can be determined therefrom (for example also using the relations I1 and I2).
I3+I4→P1-P4 known.
I5: minimum of the envelopes of M1-M3 and/or M2 M4 is the direction in which the minimum Doppler shift applies:

"front-fire".

In the following, some aspects according to the present invention will be explained.

At first, it will be dealt with various possibilities of how a microphone field can be constructed. In some embodiments, the position of the microphones can be net-like. The position of the microphones may be default in accordance with a pattern. In some embodiments, the relative distances of the microphones with respect to each other are measured for computation purposes. Hence, for example, it can be achieved that the position of the microphones is previously known. As an alternative thereto, however, information on the position of the microphones can be generated at runtime, as it is described herein.

The microphones may, for example, be arranged on a sphere, on a star-shaped construction, a disc, a ring, an x-bladed fan, a drum, a rim, a gyroscope or other bodies that can be set into rotation.

In some embodiments, the drive may be a spoke direct motor or include a spoke direct motor. In some further embodiments, the drive may be driven from the outside via a driving belt, such as in a washing machine. A momentary radial position (or a momentary angular position) may, for example, be determined via a light barrier, a stroboscope, a stepper motor increment counter or a so-called "stepper increment counter" or acoustic calibration.

The microphones may, for example, be arranged at equi-distant intervals
a) radially toward the outside;
b) tangentially toward the outside; and/or
c) perpendicularly
on a rotating circular disc.

If the system (for example the microphone field) is rotating at 1 Hz (e.g. at one revolution per second) about an axis, an entire 2Π region is sampled 44,100 times at a sampling frequency of the microphones of 44.1 kHz. What sound sources are seen by the microphone, here, for example, depends on a characteristic of the microphone.

In the following, the methods according to a) and b) will be explained briefly.

For example, if two microphones rotate about a circular disc, there is exactly one point at which the received signals are in phase, because the sound source is at the same distance to the microphones in an axially symmetrical manner. With the next sample combination pair, amplitude and phase location change. The amplitude changes at $1/r^2$, the phase shift depends on the frequency of the emitter (and/or the sound source) and the rotational speed. Figuratively speaking, it is important how many wave peaks are tunneled through by the microphone. A location of the sound source relative to the microphones can be determined from zero crossings in the amplitude/phase plane.

In the following, the method c) will be explained briefly. An "acoustic lens" can be realized with this method. For example, an N-pole zero-equalization solution may be employed.

If a sound source is exactly at the center of an axis, for example all microphones obtain the same signal, both in terms of loudness and signal traveling time. Hence, the amplitude differences are zero and the signal traveling time differences are zero, too. The system is completely in phase at equal loudness (also referred to as "equi-loudness"), since the same distance r to the sound source is present everywhere.

By way of minimization of terms and/or by way of minimization of the terms, sound sources can be searched for in a targeted manner when sampling a spherical area.

In some embodiments, the microphone field thus can be moved, with respect to its location, until the microphone signals are at least approximately equal. The microphone field here may rotate about a rotation center, while the microphone field is shifted and/or while a rotation axis of the microphone field is moved in space.

In the following, further details regarding the occurrence of a Doppler frequency shift will be explained.

In some embodiments, a signal frequency f is modulated to f' by way of variable rotation speed, according to the formula f'=f(1+w/c). In the equation mentioned, w describes a speed at which a microphone moves toward the sound source. Since one microphone each moves toward the source or sound source and/or away from it, two different frequency-modulated terms having a shifted phase location with respect to each other will result, for example. Since the relative speed of sound source-microphone is not constant, there is a modulation of the frequency to f' around the fundamental frequency f up to a maximum value $f_{max}$ at maximum relative speed. The modulation frequency is, for example, dependent on the rotational speed.

Since loudspeakers have different vibrational modes, and there are also opposite-phase sub-regions, the vibration properties of the loudspeaker membrane can be examined by way of the Doppler effect, similar to the Doppler shift of an insect when beating its wings.

In the following, the description of a piezo element and/or piezo wobbler will be given briefly.

With an additional piezo wobbler, for example, the frequency is fine-tuned to a test signal. This means that the transducer "goes with" the signal, for example follows the maximum, so that a constant waveform can be adjusted in a half wave. The piezo transducer, for example, is frequency-tunable, so that the field or "array" can be tuned to a test signal frequency.

In some embodiments, the piezo wobbler can be formed as a piezo-driven bar sled with which the microphone (or several microphones) is moved back and forth. If the movement is performed at the same frequency as that of the sound emitter, the signal is sampled at the same phase location and thereby is stationary (e.g. tuned so that it is readjusted to the maximum). Due to the wavelength, the system could be constructed in a practical way.

According to an aspect of the present invention, the three following microphone arrangements can be employed, for example:
a) n microphones radially with respect to a rotating circular disc at the disc periphery;
b) n microphones tangentially with respect to the circular disc at the disc periphery; and/or
c) n microphones perpendicularly with respect to the circular disc at the disc periphery.

Regarding a practical realization, for example, the following possibilities are conceivable:
a) "Konrad" ceiling fan with light barrier;
b) washing machines with flywheel, for example 1800 revolutions per min (rpm) and stroboscope; or
c) "Teldix" gyroscope/gyro with stepper increment counter.

The system works, for example, at a single revolution if or since 2π is sampled 44,100 times per second. In some embodiments, when sweeping an angle range of 2π (i.e. 360°), 44,100 samples of the microphone signals are captured. For this reason, it may be of advantage, in some embodiments, to under-sample at higher revolution (i.e. for example record or process less samples per revolution).

Variant c is an n-pole solution with relative zero equalization. If a sound source is exactly at the center, all microphones provide the same signal. This fact may, for example, be evaluated so as to move or align the microphone field so that all microphone signals are approximately equal. For example, the position of the sound source may be inferred therefrom.

Understanding the present invention will also be facilitated by the following publications, with some embodiments according to the invention modeling biomechanical signal processing:

Julie Goulet, Jacob Engelmann, Boris P. Chagnaud, Jan-Moritz P. Franosch, Maria D. Suttner, J. Leo van Hemmen: "Object localisation through the lateral line system of fish; Theory and experiment", Comp Physiol A (2008) 194:1 to 17; and Leo van Hemmen: "The map in our head: How does the brain represent the outside world", Chem Physchem 2002, 3, 291 to 298.

The apparatuses and methods described herein may be realized completely or partially using a computer. In other words, the apparatus according to the invention and the method according to the invention may be implemented in hardware or in software. The implementation may be on a digital storage medium, such as a disc, a CD, a DVD, an ROM, a PROM, an EPROM, an EEPROM or a FLASH memory, with electronically readable control signals capable of cooperating with a programmable computer system so that the corresponding method is executed. In general, the present invention thus also consists in a computer program product with program codes stored on a machine-readable carrier for performing the inventive method, when the computer program product is executed on a computer. In other words, the invention may also be realized as a computer program with a program code for performing the inventive method, when the computer program is executed on a computer.

While this invention has been described in terms of several embodiments, there are alterations, permutations and equivalents which fall in the scope of this invention. It should also be noted that there are many alternative ways of implementing the illumination apparatus and the illumination system as described herein. It is therefore intended that the following depending claims are interpreted as including all such alterations, permutations and equivalents as fall within the true spirit and scope of the present invention.

The invention claimed is:

1. An apparatus for localizing a sound source, comprising:
at least two rotatably arranged microphones;
a drive formed to set the microphones into rotation; and
an evaluator formed to receive microphone signals of at least two microphones, while the at least two microphones are moving, and
to acquire information on a direction from which sound from the sound source arrives or information on a position of the sound source, using the microphone signals acquired during the movement of the microphones,
wherein the evaluator is formed to evaluate a Doppler frequency shift between a first microphone signal from a first one of the microphones and a second microphone signal from a second one of the microphones to determine information on the direction from which sound from the sound source arrives or information on the position of the sound source.

2. The apparatus according to claim 1, wherein the evaluator is formed to evaluate a phase relation between the microphone signals in order to acquire the information on the direction from which the sound arrives from the sound source or the information on the position of the sound source.

3. The apparatus according to claim 1, wherein the evaluator is formed to provide the information on the direction or the information on the position depending on at which orientation of the microphones phases of the first microphone signal and of the second microphone signal differ by no more than a given threshold value.

4. The apparatus according to claim 3, wherein the evaluator is formed to provide the information on the direction or the information on the position depending on at which orientation of the microphones phases of the first microphone signal and of the second microphone signal differ by no more than a given threshold value, and depending on a difference between an amplitude of the first microphone signal and an amplitude of the second microphone signal.

5. The apparatus according to claim 1, wherein the evaluator is formed to provide the information on the direction or the information on the position depending on at which orientation of the microphones a difference between the microphone signals of the microphones is within a given range with respect to an amplitude and with respect to a phase.

6. The apparatus according to claim 1, wherein the evaluator is formed to provide the information on the direction or the information on the position depending on at which orientation of the microphones a Doppler frequency shift between a first one of the microphone signals and a second one of the microphone signals and a phase shift between the first microphone signal and the second one of the microphone signals are within a given range.

7. The apparatus according to claim 6, wherein the evaluator is formed to select, depending on at which orientation of the microphones a Doppler frequency shift satisfies a given condition, an orientation from a plurality of orientations at which a difference between the microphone signals is within a given range with respect to an amplitude and with respect to a phase, and to provide the information on the direction or the information on the position depending on the selected orientation of the microphones.

8. The apparatus according to claim 1, wherein the evaluator is formed to evaluate information on an amount of the Doppler frequency shift between a first microphone signal from a first one of the microphones and a second microphone signal from a second one of the microphones, in order to acquire the information on the direction from which the sound arrives from the sound source or the information on the position of the sound source.

9. The apparatus according to claim 8, wherein the evaluator is formed to evaluate the information on an amount of the Doppler frequency shift between the first microphone signal and the second microphone signal, in order to acquire the information as to what distance a position of the sound source comprises from a plane in which at least one of the microphones moves.

10. The apparatus according to claim 1, wherein the evaluator is formed to evaluate information on a temporal course of a Doppler frequency shift between a first microphone signal from a first one of the microphones and a second microphone signal from a second one of the microphones, in order to acquire the information on the direction from which the sound arrives or the information on the position of the sound source.

11. The apparatus according to claim 10, wherein the evaluator is formed to evaluate a time duration between two characteristic points of a temporal course of the Doppler frequency shift, in order to acquire the information on the direction from which the sound arrives or the information on the position of the sound source.

12. The apparatus according to claim 10, wherein the evaluator is formed to evaluate information, at which orientation of the microphones a minimum or maximum Doppler frequency shift occurs between the first microphone signal and the second microphone signal, in order to acquire the information on the direction from which the sound arrives or the information on the position of the sound source.

13. The apparatus according to claim 1, wherein the evaluator is formed to superimpose a microphone signal from one of the microphones recorded at a first revolution of the rotation and a microphone signal recorded at a second revolution of the rotation, in order to improve a signal-to-noise ratio.

14. The apparatus according to claim 1, wherein the evaluator is formed to correlate a microphone signal from at least one of the microphones with a comparison signal, in order to distinguish a microphone signal proportion of a sound source to be localized from spurious microphone signal proportions.

15. The apparatus according to claim 1, wherein at least two microphones are arranged on a surface of a sphere.

16. The apparatus according to claim 1, wherein the at least two microphones are arranged on a surface of a star-shaped carrier, a disc, a ring, an x-bladed fan, a drum, a rim or a gyroscope.

17. The apparatus according to claim 1, wherein the apparatus comprises a position determiner for determining an orientation of the microphones.

18. The apparatus according to claim 17, wherein the apparatus is formed to calibrate the position determiner on the basis of an acoustic calibration signal from an acoustic beacon.

19. The apparatus according to claim 1, wherein the microphones are arranged such that main sensitivity directions of the microphones are oriented away from the center of the rotation.

20. The apparatus according to claim 1, wherein the microphones are arranged such that main sensitivity directions of the microphones are oriented tangentially with respect to a direction of movement of the microphones.

21. The apparatus according to claim 1, wherein the microphones are arranged such that main sensitivity directions of the microphones are oriented at least approximately perpendicularly to a plane in which the microphones move in a rotation.

22. The apparatus according to claim 1, wherein an acoustically hard separating body is arranged between the microphones.

23. The apparatus according to claim 1, wherein the drive is formed to drive the microphones so that the microphones perform between one fifth of a revolution per second and ten revolutions per second.

24. The apparatus according to claim 1, wherein the apparatus comprises a beacon formed to mark the position or direction.

25. The apparatus according to claim 1, wherein the apparatus comprises a further microphone, which is arranged at a center between the at least two rotatably arranged microphones, and
wherein the evaluator is formed to determine the information on the direction or the information on the position, using a microphone signal from the microphone arranged at the center.

26. The apparatus according to claim 1, wherein the apparatus comprises a further microphone, which is arranged above or below a plane of movement in which the rotatably arranged microphones move, and
wherein the evaluator is formed to determine the information on the direction or the information on the position, using a microphone signal from the further microphone.

27. The apparatus according to claim 1, wherein the drive is formed to set the rotatably arranged microphones into substantially uniform rotation.

28. The apparatus according to claim 1, wherein the apparatus comprises at least four rotatably arranged microphones M1, M2, M3, M4, which are arranged to perform rotation about a rotation center.

29. The apparatus according to claim 1, wherein the evaluator is formed to sample microphone signals from the microphones at a sampling rate, and
wherein the evaluator is formed to acquire information on the sampling rate on the basis of knowledge of a frequency of a sound signal originating from the sound source and using a plurality of samples.

30. The apparatus according to claim 1, wherein the evaluator is formed to determine an autocorrelation function of at least one of the microphone signals, in order to acquire the rotational speed at which the microphones move using the autocorrelation function.

31. The apparatus according to claim 1, wherein the evaluator is formed to determine the information on the direction or the information on the position, using information describing a phase offset between signals of two microphones temporarily in line with the sound source and using information on an amount of a Doppler shift.

32. The apparatus according to claim 1, wherein the evaluator is formed to determine the information on the direction or the information on the position, using information on a characteristic point of an envelope of a difference signal, wherein the difference signal describes a difference between microphone signals of at least two of the movable microphones.

33. A method of localizing a sound source, comprising:
acquiring microphone signals from at least two microphones, while the at least two microphones perform rotation; and
determining information on a direction from which sound arrives from the sound source or information on a position of the sound source, using the microphone signals acquired during the movement of the microphones,
wherein a Doppler frequency shift between a first microphone signal from a first one of the microphones and a second microphone signal from a second one of the microphones is evaluated to determine information on the direction from which sound from the sound source arrives or information on the position of the sound source.

34. The method according to claim 33, wherein determining information on a direction or information on a position comprises determining a sampling rate at which a microphone signal from one of the microphones is sampled, based on a known frequency of the audio signal and based on samples of the at least one microphone signal.

35. The method according to claim 33, wherein determining information on a direction or information on a position comprises determining a rotational speed of the rotation on the basis of an autocorrelation of at least one microphone signal.

36. The method according to claim 33, wherein determining information on a direction or information on a position comprises determining a distance of the microphones from a center and a speed of sound on the basis of a phase offset of two microphone signals and on the basis of an amount of a Doppler frequency shift between two microphone signals.

37. The method according to claim 33, wherein determining information on a direction or information on a position comprises determining a minimum of an envelope of a difference between two microphone signals.

38. A tangible computer readable medium having a computer program for performing, when the computer program is executed on a computer, a method of localizing a sound source, comprising: acquiring microphone signals from at least two microphones, while the at least two microphones perform rotation; and determining information on a direction from which sound arrives from the sound source or information on a position of the sound source, using the microphone signals acquired during the movement of the microphones, wherein a Doppler frequency shift between a first microphone signal from a first one of the microphones and a second microphone signal from a second one of the microphones is evaluated to determine information on the direction from which sound from the sound source arrives or information on the position of the sound source.

* * * * *